United States Patent
Gao et al.

(10) Patent No.: US 10,921,979 B2
(45) Date of Patent: Feb. 16, 2021

(54) DISPLAY AND PROCESSING METHODS AND RELATED APPARATUS

(71) Applicant: Huawei Technologies Co., Ltd., Shenzhen (CN)

(72) Inventors: Wenmei Gao, Beijing (CN); Shunan Fan, Beijing (CN); Yahui Wang, Beijing (CN); Dian Fu, Shenzhen (CN); Weiguang Kong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/781,618

(22) PCT Filed: Dec. 7, 2015

(86) PCT No.: PCT/CN2015/096558
§ 371 (c)(1),
(2) Date: Jun. 5, 2018

(87) PCT Pub. No.: WO2017/096509
PCT Pub. Date: Jun. 15, 2017

(65) Prior Publication Data
US 2019/0324634 A1    Oct. 24, 2019

(51) Int. Cl.
*G06F 3/0488* (2013.01)
*G06F 3/01* (2006.01)
(Continued)

(52) U.S. Cl.
CPC .......... *G06F 3/04883* (2013.01); *G06F 3/013* (2013.01); *G06F 3/0484* (2013.01); *G06F 3/04815* (2013.01); *G06T 19/006* (2013.01)

(58) Field of Classification Search
CPC combination set(s) only.
See application file for complete search history.

(56) References Cited

U.S. PATENT DOCUMENTS

| 7,653,883 | B2 | 1/2010 | Hotelling et al. |
| 2005/0047629 | A1* | 3/2005 | Farrell ............. G06F 3/013 382/117 |

(Continued)

FOREIGN PATENT DOCUMENTS

| CN | 102981616 A | 3/2013 |
| CN | 103207728 A | 7/2013 |

(Continued)

OTHER PUBLICATIONS

Machine Translation and Abstract of Chinese Publication No. CN103294194, Sep. 11, 2013, 17 pages.
(Continued)

*Primary Examiner* — Robin J Mishler
(74) *Attorney, Agent, or Firm* — Conley Rose, P.C.

(57) ABSTRACT

A method includes obtaining, by a head mounted display, a trigger instruction and determining coordinates of a line of sight focus of a user on a screen of a portable electronic device, where the trigger instruction is used to instruct the head mounted display to perform a display operation, sending the coordinates to the portable electronic device, when the coordinates trigger the portable electronic device to determine that an object corresponding to the coordinates can be processed by the portable electronic device, obtaining, by the portable electronic device, related content of the object, obtaining the related content of the object of the portable electronic device, and displaying the related content of the object on a virtual screen.

20 Claims, 15 Drawing Sheets

(51) Int. Cl.
*G06F 3/0481* (2013.01)
*G06F 3/0484* (2013.01)
*G06T 19/00* (2011.01)

(56) References Cited

U.S. PATENT DOCUMENTS

| | | | |
|---|---|---|---|
| 2012/0086645 A1* | 4/2012 | Zheng | G06F 3/04842 345/168 |
| 2013/0182012 A1 | 7/2013 | Kim et al. | |
| 2014/0152558 A1* | 6/2014 | Salter | G06F 3/013 345/157 |
| 2014/0160001 A1* | 6/2014 | Kinnebrew | G06F 3/012 345/156 |
| 2015/0103003 A1 | 4/2015 | Kerr et al. | |
| 2015/0212576 A1* | 7/2015 | Ambrus | G06F 3/013 345/156 |
| 2015/0301596 A1 | 10/2015 | Qian et al. | |
| 2017/0242481 A1* | 8/2017 | Lu | G06F 3/013 |
| 2018/0173483 A1 | 6/2018 | Wang et al. | |

FOREIGN PATENT DOCUMENTS

| | | |
|---|---|---|
| CN | 103294194 A | 9/2013 |
| CN | 103645806 A | 3/2014 |
| CN | 103699210 A | 4/2014 |
| CN | 104238726 A | 12/2014 |
| CN | 104571525 A | 4/2015 |
| CN | 104751152 A | 7/2015 |
| CN | 104850317 A | 8/2015 |
| WO | 201401831 A1 | 12/2014 |

OTHER PUBLICATIONS

Machine Translation and Abstract of Chinese Publication No. CN104571525, Apr. 29, 2015, 13 pages.
Machine Translation and Abstract of Chinese Publication No. CN104751152, Jul. 1, 2015, 15 pages.
Foreign Communication From a Counterpart Application, PCT Application No. PCT/CN2015/096558, English Translation of International Search Report dated Sep. 14, 2016, 2 pages.
Foreign Communication From a Counterpart Application, PCT Application No. PCT/CN2015/096558, English Translation of Written Opinion dated Sep. 14, 2016, 6 pages.
Foreign Communication From a Counterpart Application, Chinese Application No. 201580079473.8, Chinese Office Action dated May 20, 2019, 25 pages.

* cited by examiner

CONT.
FROM
FIG. 3B

| Desktop applet creation module | 150 |
| Search module | 151 |
| Video and music player module | 152 |
| Drawing module | 380 |
| Presenting module | 382 |
| Word processing module | 384 |
| Web page creation module | 386 |
| Disk editing module | 388 |
| Spreadsheet module | 390 |
| Voice/audio recorder module | 163 |
| Notification module | 165 |
| ⋮ | |
| Device/global internal status | 157 |
| Camera film | 159 |
| Digital image pipeline | 161 |

FIG. 3C

DISPLAY AND PROCESSING METHODS AND RELATED APPARATUS

CROSS-REFERENCE TO RELATED APPLICATION

This application is a U.S. National Stage of International Patent Application No. PCT/CN2015/096558 filed Dec. 7, 2015, which is hereby incorporated by reference in its entirety.

TECHNICAL FIELD

The present disclosure relates to the field of portable electronic devices, and in particular, to display and processing methods and a related apparatus.

BACKGROUND

Currently, some mainstream portable electronic devices in the industry have a floating preview function, and a preview effect may be obtained when a finger is hovering over a specific location on screens such as an album, a video, a calendar, and a web page. For example, if a finger is hovering over an album folder, a photo in the folder may be previewed, if a finger is hovering over a web page text, a font may be enlarged, or if a finger is hovering over a video progress bar, a picture of a corresponding progress may be previewed.

Augmented reality (AR) is a technology of calculating a location and an angle of a camera image and adding a corresponding image in real time. An effect of AR may be presented on a screen of a portable electronic device or on a screen of smart glasses, and by comparison, the latter has better experience. When human eyes look at different directions, eyes have slight changes, and these changes generate extractable features. A device may extract the features by means of image capturing or scanning in order to track the changes of the eyes in real time to implement eye tracking. Currently, user experience of a floating preview function that is based on a floating touch technology is not good. Operation processes of recognizing and querying a target image or translating a text on a portable electronic device are relatively cumbersome and inconvenient. Particularly, for a portable electronic device with a relatively small screen, such as a smart watch, content that can be displayed on a relatively small screen of the smart watch is less. Consequently, detailed information still needs to be viewed on a connected mobile phone, and this is quite inconvenient.

SUMMARY

In view of this, according to a first aspect, a display method is provided, applied to a head mounted display, where the head mounted display keeps a wireless connection to a portable electronic device, and the method includes detecting an instruction and determining coordinates of a fixation point of a user on a screen of the portable electronic device, sending the coordinates and an indication to the portable electronic device, where the indication is used to identify the instruction, receiving related content of an object corresponding to the coordinates sent by the portable electronic device, where the related content is obtained by the portable electronic device according to the coordinates and the indication, and displaying the related content on a virtual screen corresponding to the portable electronic device.

The user browses, by means of information exchange between the head mounted display and the portable electronic device, information presented on the portable electronic device such that a preview manner is more natural and convenient, thereby improving user experience. In addition, if the portable electronic device is a terminal device with a relatively small screen, such as a smart watch, using the method provided in this application, the user can more conveniently read content on the smart watch using a head mounted display, thereby improving user experience.

In a possible implementation, the related content of the object corresponding to the coordinates includes a screenshot of a preset range on the screen of the portable electronic device, and the method further includes determining another group of coordinates of the fixation point of the user on the screenshot displayed on the virtual screen, changing the other group of coordinates into coordinates applicable to the screen of the portable electronic device, sending the changed other group of coordinates to the portable electronic device, receiving another related content of an object corresponding to the changed other group of coordinates sent by the portable electronic device, and displaying the other related content on the virtual screen corresponding to the portable electronic device.

A current eye tracking technology in the head mounted display is not precise enough. A portable electronic device cannot determine a specific object corresponding to coordinates that are of a fixation point of a user and that are determined by the head mounted display for the first time. Particularly, when an article or a text is displayed on the screen of the portable electronic device, the coordinates of the fixation point of the user may be located between two characters. Consequently, the portable electronic device cannot determine a character the user needs to translate or query. In view of this, in this implementation, a second-time selection method is provided, that is, when the portable electronic device cannot determine an object that the user needs to select, a preset-range screenshot of the coordinates received for the first time is taken, and the screenshot is sent to the head mounted display such that the head mounted display displays the screenshot to the user for a second-time coordinates selection. When the head mounted display displays the screenshot on the virtual screen, the screenshot may be enlarged for displaying in order to help the user perform the second-time coordinates selection to obtain another group of coordinates. Therefore, practicability of a product and user experience are improved.

In another possible implementation, before displaying the related content on a virtual screen corresponding to the portable electronic device, the method further includes enlarging the related content according to a preset multiple, and displaying the related content on a virtual screen corresponding to the portable electronic device includes displaying the enlarged related content on the virtual screen corresponding to the portable electronic device.

The portable electronic device may be a terminal device with a relatively small screen, such as a smart watch. For a terminal device with a relatively small screen, a displayed picture, such as an image, is relatively small and may be not clear, and consequently, it is relatively inconvenient for the user to browse. In this implementation, before displaying the related content on the virtual screen, the head mounted display first enlarges the related content, and then displays the enlarged related content such that the user can see a relatively large and clear picture using the head mounted display, thereby improving user experience.

In another possible implementation, displaying the related content on a virtual screen corresponding to the portable electronic device includes displaying all the related content on the virtual screen that is corresponding to the portable electronic device and on which preset zooming is performed.

The portable electronic device may be a terminal device with a relatively small screen, such as a smart watch. For a terminal device with a relatively small screen, a displayed picture is relatively small. The screen may not completely display all content of one piece of information, such as a short message service message. However, the virtual screen is obtained by means of projection using the head mounted display such that a size of the virtual screen may be adjusted by the head mounted display. In this way, the user may enlarge the virtual screen to display all content of the related content such as a short message service message.

In another possible implementation, the method further includes displaying a mark of the fixation point of the user on at least one of the screen of the portable electronic device or the virtual screen.

In another possible implementation, the method further includes detecting another instruction and stop displaying the related content on the virtual screen, or closing the virtual screen, where the other instruction is used to instruct the head mounted display and the portable electronic device to perform an operation of stop displaying the related content.

According to the first aspect, a display method is further provided, applied to a portable electronic device, where the portable electronic device keeps a wireless connection to a head mounted display, and the method includes receiving coordinates and an indication sent by the head mounted display, where the coordinates are coordinates of a fixation point of a user on a screen of the portable electronic device, and the indication is used to identify the instruction, obtaining, by the portable electronic device according to the coordinates and the indication, related content of an object corresponding to the coordinates, and sending the related content to the head mounted display.

According to a second aspect, a display method is provided, applied to a head mounted display, where the head mounted display keeps a wireless connection to a portable electronic device, and the method includes detecting an instruction and determining coordinates of a fixation point of a user on a screen of the portable electronic device, sending the coordinates to the portable electronic device, receiving related content of an object corresponding to the coordinates sent by the portable electronic device, where the related content is obtained by the portable electronic device according to the coordinates, and displaying the related content on a virtual screen corresponding to the portable electronic device.

In a possible implementation, before displaying the related content on a virtual screen corresponding to the portable electronic device, the method further includes enlarging the related content according to a preset multiple, and displaying the related content on a virtual screen corresponding to the portable electronic device includes displaying the enlarged related content on the virtual screen corresponding to the portable electronic device.

In another possible implementation, displaying the related content on a virtual screen corresponding to the portable electronic device includes displaying all the related content on the virtual screen that is corresponding to the portable electronic device and on which preset zooming is performed.

According to a third aspect, a display method is provided, applied to a portable electronic device, and the method includes detecting a voice input and determining coordinates of a fixation point of a user, when an object corresponding to the coordinates of the fixation point is an application, using, as an input of the object, a text recognized according to the voice input, and displaying a screen outputted by the object according to the text.

The portable electronic device determines, according to the obtained coordinates of the fixation point of the user, which application is an object corresponding to the voice input of the user. For example, the user gazes at a searching application and input a voice "Summer Palace" such that the portable electronic device determines that the object corresponding to the coordinates of the fixation point of the user is the searching application. A text corresponding to the voice input "Summer Palace" is recognized, and the application is opened. "Summer Palace" is used as the input and is searched for in the opened application, and a screen obtained after the searching is presented to the user. In this way, the user does not need to manually select an application and input to-be-found content into the application to browse required information. In this display method, when the user gazes at an application and inputs to-be-found information using a voice, the portable electronic device automatically locates the application, and runs the application to perform a related operation such that it is more convenient for the user to search and browse, thereby improving user experience.

In a possible implementation, after the voice input is detected, the method further includes recognizing the text according to the voice input.

In another possible implementation, recognizing the text according to the voice input includes determining that a voiceprint of the voice input matches a pre-stored voiceprint, and recognizing the text according to the voice input.

According to a fourth aspect, a display method is provided, applied to a portable electronic device, where the portable electronic device keeps a wireless connection to a head mounted display, and the method includes receiving coordinates sent by the head mounted display, where the coordinates are coordinates that are determined by the head mounted display and that are of a fixation point of a user on a screen of the portable electronic device, when an object corresponding to the coordinates is manipulable, determining a type of the object, determining related content of the object according to the type of the object, and sending the related content to the head mounted display.

In a possible implementation, determining related content of the object according to the type of the object includes performing an open operation on the object, and using, as the related content of the object, content obtained after the open operation if the type of the object is a picture thumbnail, performing an open operation or a play operation on the object, and using, as the related content of the object, content obtained after the open operation or the play operation if the type of the object is a video thumbnail, performing an open operation on the object, taking a screenshot of content obtained after the open operation, and using the screenshot as the related content of the object if the type of the object is a folder or a directory, performing an open operation or a loading operation on the object, taking a screenshot of content obtained after the open operation or the loading operation, and using the screenshot as the related content of the object if the type of the object is a hyperlink, performing an open operation on the object, and using, as the related content of the object, content obtained after the open operation if the type of the object is an application icon, performing at least one operation of a searching operation and a translation operation on the object, and using, as the related content of the object, content obtained after the at least one operation if the type of the object is a character or a text, or performing image recognition on the object, performing a searching operation on a recognized face or a recognized object, and using, as the related content of the object, content obtained after the searching operation if the type of the object is a picture or an image.

According to a fifth aspect, a display method is provided, applied to a portable electronic device, where the portable electronic device keeps a wireless connection to a head mounted display, and the method includes detecting an instruction, receiving coordinates sent by the head mounted display, where the coordinates are coordinates that are determined by the head mounted display and that are of a fixation point of a user on a screen of the portable electronic device, obtaining, according to the instruction, related content of an object corresponding to the coordinates, and sending the related content to the head mounted display.

According to a sixth aspect, a head mounted display is provided, where the head mounted display keeps a wireless connection to a portable electronic device, and includes a unit that is configured to execute the method according to the first aspect or any possible implementation of the first aspect.

According to a seventh aspect, a head mounted display is provided, where the head mounted display keeps a wireless connection to a portable electronic device, and includes a unit that is configured to execute the method according to the second aspect or any possible implementation of the second aspect.

According to an eighth aspect, a portable electronic device is provided, and includes a unit that is configured to execute the method according to the third aspect or any possible implementation of the third aspect.

According to a ninth aspect, a portable electronic device is provided, where the portable electronic device keeps a wireless connection to a head mounted display, and includes a unit that is configured to execute the method according to the fourth aspect or any possible implementation of the fourth aspect.

According to a tenth aspect, a portable electronic device is provided, where the portable electronic device keeps a wireless connection to a head mounted display, and includes a unit that is configured to execute the method according to the fifth aspect or any possible implementation of the fifth aspect.

According to an eleventh aspect of this application, a head mounted display is provided, including one or more processors, a memory, a bus system, and an interface circuit, where the one or more processors, the memory, and the interface circuit are connected using the bus system, and the memory stores a computer instruction, and when the one or more processors execute the computer instruction, the head mounted display executes according to any one of implementations of the first aspect or the second aspect.

According to a twelfth aspect, a portable electronic device is provided, including one or more processors, a memory, a bus system, and an interface circuit, where the one or more processors, the memory, and the interface circuit are connected using the bus system, and the memory stores a computer instruction, and when the one or more processors execute the computer instruction, the portable electronic device executes according to any one of implementations of the third aspect, the fourth aspect, or the fifth aspect.

According to a thirteenth aspect, a readable storage medium that stores one or more programs is provided, where the one or more programs include an instruction, and when the instruction is being executed by a head mounted display, the head mounted display executes according to any one of implementations of the first aspect or the second aspect.

According to a fourteenth aspect, a readable storage medium that stores one or more programs is provided, where the one or more programs include an instruction, and when the instruction is being executed by a portable electronic device, the portable electronic device executes according to any one of implementations of the third aspect, the fourth aspect, or the fifth aspect.

This application provides a display method, including obtaining, by a head mounted display, a trigger instruction and determining coordinates of a line of sight focus of the user on a screen of a portable electronic device, where the trigger instruction is used to instruct the head mounted display to perform a display operation, sending the coordinates to the portable electronic device, when the coordinates trigger the portable electronic device to determine that an object corresponding to the coordinates can be processed by the portable electronic device, obtaining, by the portable electronic device, related content of the object, obtaining the related content of the object of the portable electronic device, and displaying the related content of the object on a virtual screen. In this way, the user browses, by means of information exchange between the head mounted display and the portable electronic device, information presented on the portable electronic device such that a preview manner is more natural and convenient, thereby improving user experience. In addition, if the portable electronic device is a terminal device with a relatively small screen, such as a smart watch, using the method provided in this application, the user can more conveniently read content on the smart watch using a head mounted display, thereby improving user experience.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

FIG. 3A, FIG. 3B, and FIG. 3C are another schematic diagram of an example device according to this application;

DESCRIPTION OF EMBODIMENTS

Head mounted displays include smart glasses and a smart helmet. A head mounted display has an AR function and an eye tracking function.

Portable electronic devices include various types of screen-based portable electronic devices such as a mobile phone, a tablet computer, a personal computer (PC), a television (TV), a public billboard, a smart watch, and an in-vehicle portable electronic device.

Figure 1:
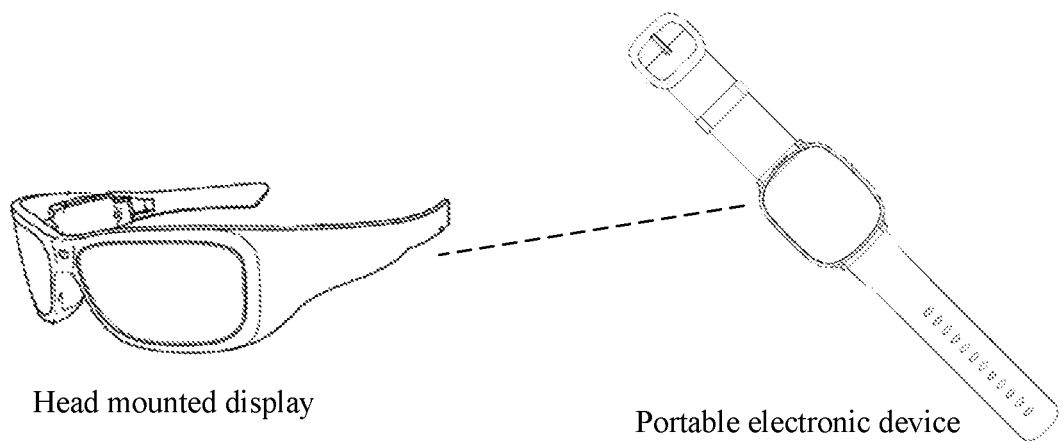
FIG. 1 is a schematic diagram of an application scenario of a display method according to this application.

FIG. 1 is a schematic diagram of information exchange between a head mounted display and a portable electronic device. The head mounted display is wirelessly connected to the portable electronic device, and a wireless connection includes a BLUETOOTH connection, a WI-FI connection, and the like. When a user wears a head mounted display, the user may view, in a preset location using an AR function of the head mounted display, a picture presented by the head mounted display. The picture is a presentation of screen information or application information that is of the portable electronic device and that is obtained by the head mounted display. A picture displayed by the head mounted display may be presented on a lens of the head mounted display or be directly projected by the head mounted display onto a retina of the user for presentation.

Example Device:

Now the embodiments are referred to in detail, and examples of the embodiments are shown in the accompanying drawings. Many specific details are provided in the following detailed description in order to provide a full understanding of the present disclosure. However, it is obvious to persons skilled in the art that the present disclosure may be practiced without the specific details. In other cases, well-known methods, processes, components, circuits, and networks are not described in detail such that aspects of the embodiments are easy to understand.

The terms used in the description of the present disclosure in this specification are merely for the purpose of describing specific embodiments, and are not intended to limit the present disclosure. The terms "one", "a" and "this" of singular forms used in this specification and the appended claims of the present disclosure are also intended to include plural forms, unless otherwise specified in the context clearly. It should be further understood that the term "and/or" used in this specification indicates and includes any or all possible combinations of one or more items in associated listed items. It should be further understood that the term "comprise" and/or "include" used in this specification specifies presence of features, integers, steps, operations, elements, and/or components, with presence or addition of one or more other features, integers, steps, operations, elements, components, and/or their combinations not excluded.

According to the context, the term "if" used in this specification may be interpreted as a meaning of "when" or "after" or "in response to determining" or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

An electronic device, a user interface configured for such a device, and an embodiment used for an associated process in which such a device is used are described. In some embodiments, the device is a portable communications device, such as a mobile phone, that further includes another function such as a personal digital assistant and/or music player function. An example embodiment of a portable electronic device includes but is not limited to a portable electronic device using IOS®, ANDROID®, MICROSOFT®, or another operating system. Another portable electronic device such as a laptop computer or a tablet computer that has a touch sensitive surface (for example, a touchscreen display and/or a touchpad) may also be used. It should be further understood that in some embodiments, the device is not a portable communications device, but a desktop computer that has a touch sensitive surface (for example, a touchscreen display and/or a touchpad).

An electronic device including a display and a touch sensitive surface is described in the following discussion. However, it should be understood that the electronic device may include one or more other physical user interface devices, such as a physical keyboard, a mouse, and/or a joystick.

The device generally supports various application programs, such as one or more of the following programs, a drawing application program, a presentation application program, a word processing application program, a web page creation application program, a disk editing application program, a spreadsheet application program, a game application program, a phone application program, a video conference application program, an electronic mail (email) application program, an instant message application program, an exercise support application program, a photograph management application program, a digital camera application program, a digital video camera application program, a network browsing application program, a digital music player application program, or a digital video player application program.

Various application programs that can be executed on the device may use at least one common physical user interface device, such as a touch sensitive surface. One or more functions of the touch sensitive surface and corresponding information displayed on the device may be adjusted and/or changed from an application program to a next application program and/or may be adjusted and/or changed in a corresponding application program. In this way, a common physical architecture (for example, a touch sensitive surface) of the device may support the various application programs using a user interface that is intuitive and clear to a user.

Figure 2A:
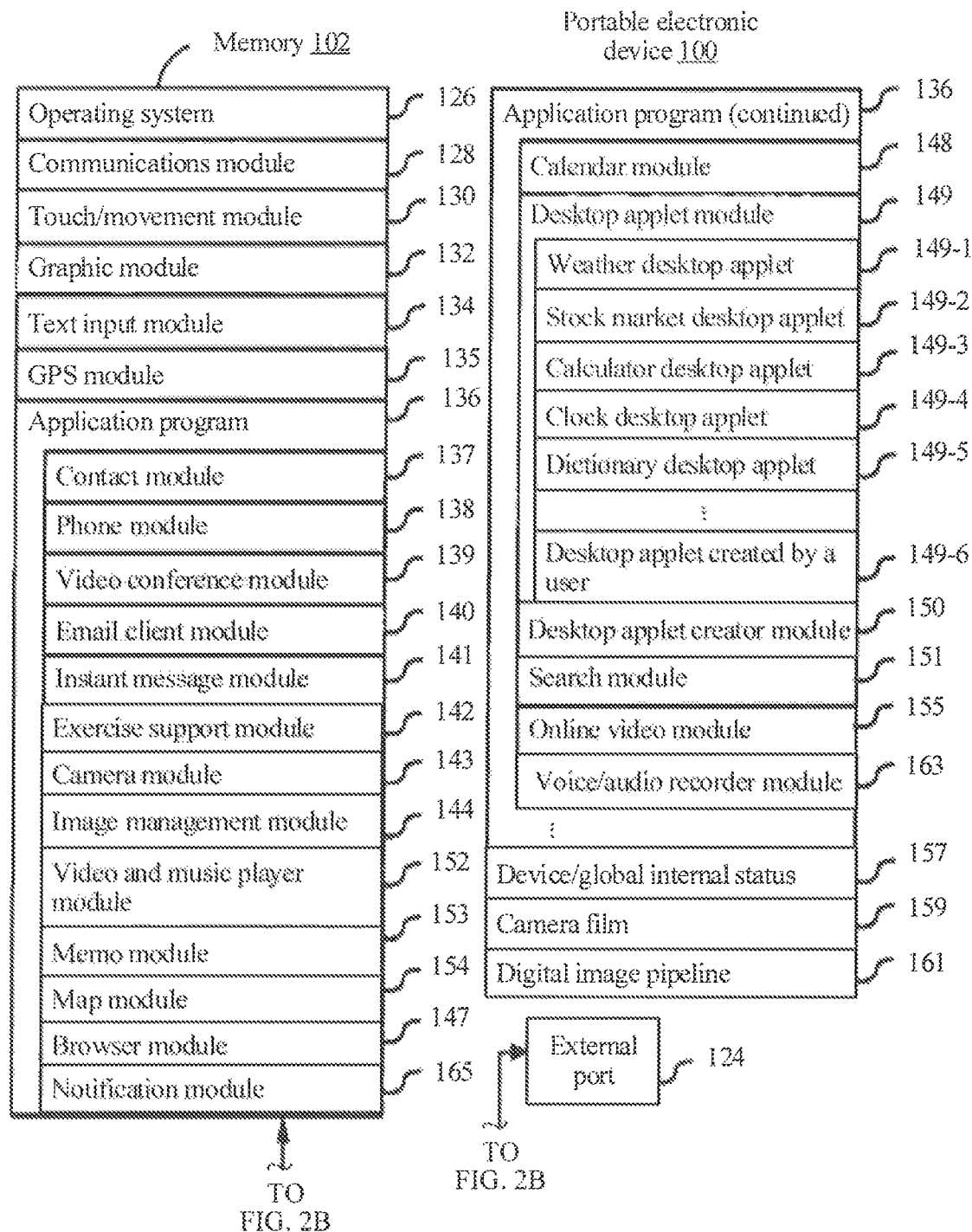
FIG. 2A and FIG. 2B are a schematic diagram of an example device according to this application.
Figure 2B:
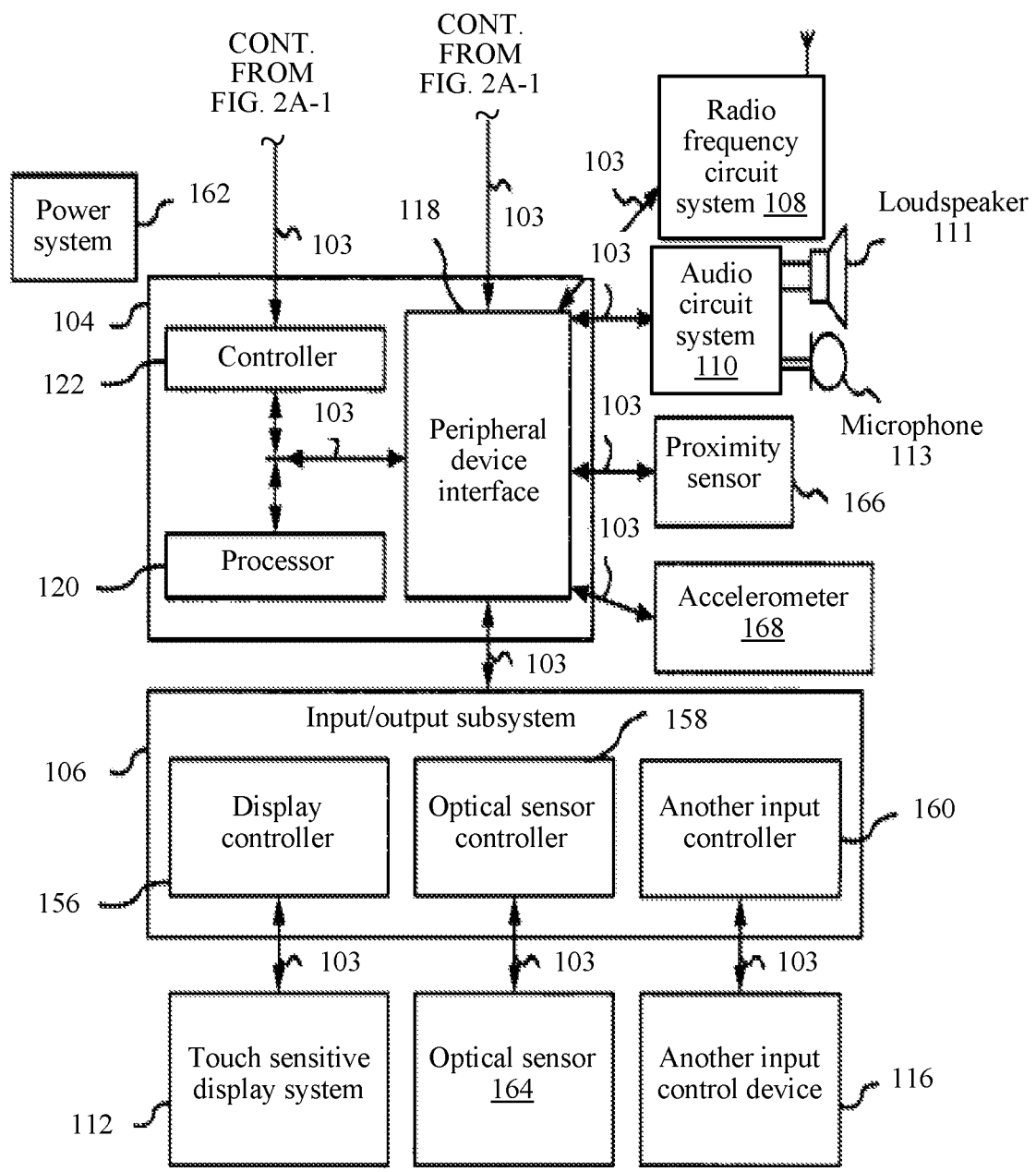

Now an embodiment of a portable device that has a touch sensitive display is focused. FIG. 2A and FIG. 2B are a block diagram of a portable electronic device 100 that has a touch sensitive display 112 according to some embodiments. The touch sensitive display 112 is also referred to as a "touchscreen" in some cases for ease of description, or be referred to as a touch sensitive display system, or be referred to as a display system that has a touch sensitive surface and a display. The device 100 may include a memory 102 (which may include one or more computer-readable storage media), a memory controller (designated as controller) 122, one or more central processing units (CPUs) (designated as processor) 120, a peripheral device interface 118, a radio frequency (RF) circuit system 108, an audio circuit system 110, a loudspeaker 111, a microphone 113, an input/output (I/O) subsystem 106, another input control device 116, and an external port 124. The device 100 may include one or more optical sensors 164. These components may perform communication using one or more communications buses or signal lines 103.

It should be understood that the device 100 is merely an example of a portable electronic device, and the device 100 may include components more or less than components shown in the figures, and may include a combination of two or more components, or include different configurations or arrangements of the components. Various components shown in FIG. 2A and FIG. 2B may be implemented in a manner of using hardware, software, or a combination of hardware and software, and include one or more signal processing circuits and/or application-specific integrated circuits.

The memory 102 may include a high-speed random access memory (RAM), and may further include a non-volatile memory, such as one or more magnetic disk storage devices, a flash memory device, or another non-volatile solid-state storage device. Access of another component (such as the processor 120 and the peripheral device interface 118) of the device 100 to the memory 102 may be controlled by the memory controller 122.

An I/O peripheral device of a device may be coupled to the processor 120 and the memory 102 using the peripheral device interface 118. The one or more processors 120 run or execute various software programs and/or instruction sets stored in the memory 102 in order to implement various functions of the device 100 and process data. In some embodiments, the one or more processors 120 include an image signal processor and a dual-core or multicore processor.

In some embodiments, the peripheral device interface 118, the processor 120, and the controller 122 may be implemented on a single chip such as a chip 104. In some other embodiments, the peripheral device interface 118, the processor 120, and the controller 122 may be implemented on an independent chip.

An RF circuit system 108 receives and sends an RF signal, which is also referred to as an electromagnetic signal. The RF circuit system 108 converts an electrical signal into an electromagnetic signal or converts an electromagnetic signal into an electrical signal, and communicates with a communications network and another communications device using the electromagnetic signal. The RF circuit system 108 may include a well-known circuit system that is configured to implement these functions, including but not limited to an antenna system, an RF transceiver, one or more amplifiers, a tuner, one or more oscillators, a digital signal processor, a codec chip set, a subscriber identity module (SIM) card, a memory, and the like. The RF circuit system 108 may communicate with a network and another device by means of wireless communications. The network may be the Internet, an intranet and/or a wireless network (such as a cellular phone network, a wireless local area network (WLAN), and/or a metropolitan area network (MAN)). The wireless communications may be any type of multiple communications standards, protocols and technologies, including but not limited to Global System for Mobile Communications (GSM), Enhanced Data Rates for GSM Evolution (EDGE), High Speed Downlink Packet Access (HSDPA), High Speed Uplink Packet Access (HSUPA), Wideband Code Division Multiple Access (W-CDMA), Code Division Multiple Access (CDMA), Time Division Multiple Access (TDMA), BLUETOOTH, WI-FI (for example, Institute of Electrical and Electronics Engineers (IEEE) 802.11a, IEEE 802.11b, IEEE 802.11g, and/or IEEE 802.11n), Voice over Internet Protocol (VoIP), WIMAX, an email protocol (for example, Interactive Mail Access Protocol (IMAP) and/or Post Office Protocol (POP)), instant messaging (for example, Extensible Messaging and Presence Protocol (XMPP), session initiation protocol (SIP) for Instant Messaging and Presence Leveraging Extensions (SIMPLE), instant message and presence service (IMPS)), and/or short message service (SMS), or any other proper communications protocol, which includes a communications protocol that is not yet developed after this application is filed.

The audio circuit system 110, the loudspeaker 111, and the microphone 113 provide an audio interface between a user and the device 100. The audio circuit system 110 receives audio data from the peripheral device interface 118, converts the audio data into an electrical signal, and transmits the electrical signal to the loudspeaker 111. The loudspeaker 111 converts the electrical signal into a sound wave that human can hear. The audio circuit system 110 further receives an electrical signal that is converted from a sound wave by the microphone 113. The audio circuit system 110 converts the electrical signal into audio data and transmits the audio data to the peripheral device interface 118 for processing. The audio data may be retrieved by the peripheral device interface 118 from the memory 102 and/or the RF circuit system 108, and/or be transmitted by the peripheral device interface 118 to the memory 102 and/or the RF circuit system 108. In some embodiments, the audio circuit system 110 further includes a headset jack (not shown). The headset jack provides an interface between the audio circuit system 110 and a removable audio I/O peripheral device. The peripheral device may be an output-only headset (for example, a single-earpiece headset or a double-earpiece headset) or an I/O headset (for example, a microphone).

In the I/O subsystem 106, I/O peripheral devices on the device 100, such as a touchscreen 112 and another input control device 116, are coupled to the peripheral device interface 118. The I/O subsystem 106 may include a display controller 156 and another input controller 160 used for another input control device 116. The one or more input controllers 160 receive an electrical signal from another input control device 116 or send an electrical signal to another input control device 116. The other input control device 116 may include a physical button (for example, a push button and a rocker button), a dial pad, a slider switch, a joystick, a click wheel, and the like. In some other embodiments, the other input controller 160 may (or may not) be coupled to any one of a keyboard, an infrared port, a universal serial bus (USB) port, or a pointer device such as a mouse. One or more buttons may include buttons for increasing or decreasing volume of a loudspeaker 111 and/or a microphone 113. The one or more buttons may include a push button.

The touch sensitive display 112 provides an input interface and an output interface between a device and a user. The display controller 156 receives an electrical signal from the touchscreen 112 and/or sends an electrical signal to the touchscreen 112. The touchscreen 112 displays a visual output to the user. The visual output may include a graph, a text, an icon, a video, and any combination thereof (collectively referred to as a "graph"). In some embodiments, some or all of the visual output may be corresponding to a user interface object.

The touchscreen 112 has a touch sensitive surface, a sensor, or a sensor set that receives an input from a user based on a touch sensation and/or a tactile touch. The touchscreen 112 and the display controller 156 (together with any associated module and/or instruction set in the memory 102) detect a touch on the touchscreen 112 (and any movement or interruption of the touch), and convert the detected touch into interaction with a user interface object (for example, one or more soft keys, icons, web pages, or images) that is displayed on the touchscreen 112. In an example embodiment, a touch point between the touchscreen 112 and a user corresponds to a finger of the user.

The touchscreen 112 may use liquid crystal display (LCD) technology, a light emitting polymer display (LPD) technology, or a light emitting diode (LED) technology, but another display technology may be used in another embodiment. The touchscreen 112 and the display controller 156 may detect a touch and any movement or interruption of the touch using any technology of multiple currently known or future-developed touch sensing technologies, and using another proximity sensor array or another element configured to determine one or more touch points on the touchscreen 112. The multiple touch sensing technologies include but are not limited to a capacitance technology, a resistance technology, an infrared technology, and a surface acoustic wave technology. A projected mutual-capacitance sensing technology is used in an example embodiment.

The touchscreen 112 may have a video resolution that is greater than 100 dots per inch (dpi). In some embodiments, a touchscreen has a video resolution that is approximately 160 dpi. A user may touch the touchscreen 112 using any proper object or an additional object such as a stylus and a finger. In some embodiments, a user interface is designed to operate with a finger-based touch or a gesture, and compared with a stylus-based input, this has lower precision because of a larger touch area of a finger on a touchscreen. In some embodiments, a device translates a finger-based rough input into a precise pointer/cursor location or a command in order to perform an action expected by a user.

In some embodiments, except a touchscreen, the device 100 may include a touchpad (not shown) configured to activate or deactivate a specific function. In some embodiments, the touchpad is a touch sensitive area of a device, and the touch sensitive area is different from a touchscreen because the touch sensitive area does not display a visual output. The touchpad may be a touch sensitive surface that is separate from the touchscreen 112, or is an extended part of a touch sensitive surface formed by the touchscreen.

The device 100 further includes a power system 162 that is configured to supply power for various components. The power system 162 may include a power management system, one or more power supplies (for example, a battery and an alternating current (AC)), a recharging system, a power fault detection circuit, a power converter or inverter, a power status indicator (for example, an LED), and any other component that is associated with power generation, management, and allocation in a portable device.

The device 100 may further include one or more optical sensors 164. FIG. 2A and FIG. 2B show an optical sensor of an optical sensor controller 158 that is coupled to an I/O subsystem 106. The optical sensor 164 may include a charge coupled device (CCD) or a complementary metal-oxide-semiconductor (CMOS) opto-electronic transistor. The optical sensor 164 receives, from an environment, light projected using one or more lenses, and converts the light into data that represents an image. Combined with an imaging module 143 (also referred to as a camera module), the optical sensor 164 may capture a static image or a video. In some embodiments, one or more optical sensors are located in the back of the device 100 and are opposite to a touchscreen display 112 in the front of the device. Therefore, the touchscreen display may be used as a viewfinder configured to collect a static image and/or a video image. In some embodiments, another one or more optical sensors are located in the front of the device such that during a video conference, the user may obtain an image of the user at the same time of watching another video reference participant on a touchscreen display.

The device 100 may further include one or more proximity sensors 166. FIG. 2A and FIG. 2B show a proximity sensor 166 coupled to a peripheral device interface 118. As another choice, the proximity sensor 166 may be coupled to another input controller 160 in the I/O subsystem 106. In some embodiments, when an electronic device is disposed near a user's ear (for example, when the user is making a phone call), the proximity sensor 166 closes and the touchscreen 112 is disabled.

The device 100 may further include one or more accelerometers 168. FIG. 2A and FIG. 2B show an accelerometer 168 coupled to a peripheral device interface 118. As another choice, the accelerometer 168 may be coupled to another input controller 160 in the I/O subsystem 106. In some embodiments, based on analysis on data received from the one or more accelerometers, information is displayed in a portrait view or a landscape view on a touchscreen display. Optionally, in addition to the accelerometer 168, the device 100 further includes a magnetometer (not shown) and a global positioning system (GPS) (or GLONASS, the BeiDou Navigation Satellite System, or another global navigation system) receiver (not shown) configured to obtain information about a location and an orientation (for example, portrait or landscape) of the device 100.

In some embodiments, software components stored in the memory 102 include an operating system 126, a communications module (or an instruction set) 128, a touch/movement module (or an instruction set) 130, a graphic module (or an instruction set) 132, a text input module (or an instruction set) 134, a GPS module (or an instruction set) 135, and an application program (or an instruction set) 136. In addition, in some embodiments, as shown in FIG. 2A, FIG. 2B, FIG. 3A, FIG. 3B, and FIG. 3C, the memory 102 stores a device/global internal status 157. The device/global internal status 157 includes one or more of the following statuses of an active application program status, used to indicate an application program (if existing) that is active currently, a display status, used to indicate an application program, a view, or other information that occupies an area of the touchscreen display 112, or a sensor status, including information obtained from each sensor of the device and the input control device 116, and location information of a location and a posture of the device.

The operating system 126 (for example, Darwin, RTXC, LINUX, UNIX, OS X, WINDOWS, ANDROID, or an embedded operating system, such as VXWORKS) includes various software components and/or drivers configured to control and manage general system tasks (for example, memory management, storage device control, and power management), and facilitates communication among various hardware components and software components. In addition, in some embodiments, the memory 102 stores a camera film 159 and a digital image pipeline 161.

The communications module 128 facilitates communication with another device using one or more external ports 124, and further includes various software components configured to process data received by the RF circuit system 108 and/or the external port 124. The external port 124 (for example, a USB and a live line) may be directly coupled to another device or be indirectly coupled to another device using a network (for example, the Internet or a WLAN). In some embodiments, the external port is a multi-pin (for example, 30-pin) connector that is the same as or similar to and/or compatible with a 30-pin connector used on an IPOD of APPLE Inc. device.

The touch/movement module 130 may detect a touch on the touchscreen 112 (combined with the display controller 156) and another touch sensitive device (for example, a touchpad, or a physical click wheel). The touch/movement module 130 includes multiple software components configured to execute various operations related to touch detection. The operations may include determining whether a touch appears (for example, detecting a finger push event), determining whether a touch is moving and tracking the movement on an entire touch sensitive surface (for example, detecting one or more finger dragging events), determining whether a touch ends (for example, detecting a finger uplift event or a touch interruption), and the like. The touch/movement module 130 receives touch data from a touch sensitive surface. Determining a movement of a touch point may include determining a rate (a magnitude), a speed (a magnitude and a direction), and/or an acceleration (a change of a magnitude and/or a direction) of the touch point. A movement of the touch point is represented using a series of touch data. These operations may be applied to a single touch (for example, a one-finger touch) or multiple simultaneous touches (for example, a "multi-touch"/a multi-finger touch). In some embodiments, the touch/movement module 130 and the display controller 156 detect a touch on a touchpad.

The touch/movement module 130 may detect a user gesture input. Different gestures on the touch sensitive surface have different touch patterns. Therefore, a gesture may be detected by detecting a specific touch pattern. For example, detecting a single-finger tap gesture includes detecting a finger push event and then detecting a finger uplift (off-surface) event in a location (for example, a location of an icon) the same as (or basically the same as) that of the finger push event. For another example, detecting a finger flick gesture on the touch sensitive surface includes detecting a finger push event, and then detecting one or more finger dragging events, and subsequently detecting a finger uplift (off-surface) event.

The graphic module 132 includes multiple known software components configured to render and display graphics on the touchscreen 112 or another display, including a component configured to change intensity of the displayed graphics. As used in this specification, the term "graph" includes any object that may be displayed to the user, and is not limited to a text, a web page, an icon (such as a user interface object that includes a soft key), a digital image, a video, an animation, and the like.

In some embodiments, the graphic module 132 stores to-be-used data to represent a graph. A corresponding code may be allocated to each graph. The graphic module 132 receives, from an application program and the like, one or more codes of a graph that is specified to be displayed, or receives, if necessary, coordinate data and other graph attribute data together with one or more codes, and then generates screen image data and outputs the screen image data to the display controller 156.

A text input module 134 that may be used as a component of the graphic module 132 provides a soft keyboard that is configured to input a text into various application programs (for example, a contact module 137, an email client module 140, an instant message module 141, a browser module 147, and any other application program that requires a text input).

A GPS module 135 determines a location of a device, and provides information about the location for use in various application programs (for example, the information is provided for a phone module 138 for location-based dialing, and is provided for a camera module 143 as a graph/video metadata, and is provided for an application program that provides a location-based service, such as a weather desktop applet, a local directory desktop applet, and a map/navigation desktop applet).

The application program 136 may include the following modules (or instruction sets) or a subgroup or a superset of the following modules a contact module 137 (also referred to as an address book or a contact list in some cases), a phone module 138, a video conference module 139, an email client module 140, an instant message (IM) module 141, an exercise support module 142, a camera module 143 for a static image and/or a video image, an image management module 144, a browser module 147, a calendar module 148, a desktop applet module 149, which may include one or more of the following applets a weather desktop applet 149-1, a stock market desktop applet 149-2, a calculator desktop applet 149-3, a clock desktop applet 149-4, a dictionary desktop applet 149-5, another desktop applet obtained by a user, or a desktop applet 149-6 created by the user, a desktop applet creator module 150 that is configured to generate the desktop applet 149-6 created by the user, a search module 151, a video and music player module 152, which may be constituted by a video player module and a music player module, a memo module 153, a map module 154, an online video module 155, a voice/audio recorder module 163, and/or a notification module 165.

An example of another application program 136 that may be stored in the memory 102 includes another word processing application program, another image-editing application program, a drawing application program, a presenting application program, a JAVA-enabled application program, an encryption application program, a digital rights management application program, a voice recognition application program, and a voice reproduction application program.

Combined with the touchscreen 112, the display controller 156, the touch module 130, the graphic module 132, and the text input module 134, the contact module 137 may be configured to manage an address book or a contact list (for example, storing contact information in an application program internal status 192 (see FIG. 2C) of the contact module 137 in the memory 102 or a memory 370 (see FIG. 3B)). The management includes adding a name to the address book, deleting a name from the address book, associating a phone number, an email address, an actual address, or other information with the name, associating an image with the name, classifying and categorizing names, providing a phone number or an email address to initiate and/or promote communication performed using the phone module 138, a video conference module 139, an email client module 140, or an IM 141, and the like.

Combined with the RF circuit system 108, the audio circuit system 110, the loudspeaker 111, the microphone 113, the touchscreen 112, the display controller 156, the touch module 130, the graphic module 132, and the text input module 134, the phone module 138 may be configured to input a character sequence corresponding to a phone number, visit one or more phone numbers on the address book 137, modify an inputted phone number, dial a corresponding phone number, make a phone call, and disconnect the call or hang up the phone when the phone call is completed. As described above, wireless communications may use any communications standard, protocol, or technology.

Combined with the RF circuit system 108, the audio circuit system 110, the loudspeaker 111, the microphone 113, the touchscreen 112, the display controller 156, the optical sensor 164, the optical sensor controller 158, the touch module 130, the graphic module 132, the text input module 134, the contact list 137, and the phone module 138, the video conference module 139 includes an executable instruction that is used to initiate, perform, and end a video conference between the user and one or more other participants according to a user instruction.

Combined with the RF circuit system 108, the touchscreen 112, the display controller 156, the touch module 130, the graphic module 132, and the text input module 134, the email client module 140 includes an executable instruction that is used to respond to the user instruction to create, send, receive, and manage an email. Combined with the image management module 144, the email client module 140 facilitates creation and sending of an email that has a static image or a video image photographed by the camera module 143.

Combined with the RF circuit system 108, the touchscreen 112, the display controller 156, the touch module 130, the graphic module 132, and the text input module 134, the instant message module 141 includes an executable instruction, which is used to input a character sequence corresponding to an instant message, modify the previously inputted character, transmit a corresponding instant message (for example, a phone-based instant message that uses an SMS or multimedia message service (MMS) protocol, or an Internet-based instant message that uses XMPP, SIMPLE, or IMPS), receive the instant message, and check the received instant message. In some embodiments, the transmitted and/or received instant message may include a graph, a photo, an audio file, a video file, and/or another attachment supported by an MMS and/or an enhanced message service (EMS). As used in this specification, an "instant message" is both a phone-based message (for example, a message sent using an SMS or an MMS) and an Internet-based message (for example, a message sent using the XMPP, the SIMPLE, or the IMPS).

Combined with the RF circuit system 108, the touchscreen 112, the display controller 156, the touch module 130, the graphic module 132, the text input module 134, the GPS module 135, the map module 154, and the music player module 146, the exercise support module 142 includes an executable instruction, which is used to create an exercise (for example, an exercise that has a time, a distance, and/or a calorie consuming target), communicate with an exercise sensor (a sports device), receive data from the exercise sensor, calibrate a sensor configured to monitor the exercise, select and play music for the exercise, and display, store, and transmit exercise data.

Combined with the touchscreen 112, the display controller 156, an optical sensor 164, an optical sensor controller 158, the touch module 130, the graphic module 132, the digital image pipeline 161 (which converts original data from an optical sensor into a final image or video), and the image management module 144, the camera module 143 includes an executable instruction that is used to capture a static image or a video (including a video stream) and store the static image or the video in the memory 102 (for example, in the camera film 159), and modify a feature of the static image or the video, or delete the static image or the video from the memory 102 (for example, from the camera film 159).

Combined with the touchscreen 112, the display controller 156, the touch module 130, the graphic module 132, the text input module 134, and the camera module 143, the image management module 144 includes an executable instruction that is used to arrange, modify (for example, edit), or manipulate in another manner, tag, delete, present (for example, in a digital slideshow or an album), and store a static image and/or a video image (including a static image and/or a video image stored in the camera film 159).

Combined with the RF circuit system 108, the touchscreen 112, the display system controller 156, the touch module 130, the graphic module 132, and the text input module 134, the browser module 147 includes an executable instruction that is used to browse the Internet (including searching, linking to, receiving, and displaying a web page or a part of the web page, and linking to an attachment and another file of the web page) according to a user instruction.

Combined with the RF circuit system 108, the touchscreen 112, the display system controller 156, the touch module 130, the graphic module 132, the text input module 134, the email client module 140, and the browser module 147, the calendar module 148 includes an executable instruction that is used to create, display, modify, and store a calendar and calendar-associated data (for example, a calendar entry, a to-do task list) according to a user instruction.

Combined with the RF circuit system 108, the touchscreen 112, the display system controller 156, the touch module 130, the graphic module 132, the text input module 134, and the browser module 147, the desktop applet module 149 may be a micro-application program (for example, the weather desktop applet 149-1, the stock market desktop applet 149-2, the calculator desktop applet 149-3, the clock desktop applet 149-4, and the dictionary desktop applet 149-5) downloaded and used by the user or a micro-application program created by the user (for example, the desktop applet 149-6 created by the user). In some embodiments, a desktop applet includes a Hypertext Markup Language (HTML) file, a cascading style sheet (CSS) file, and a JAVASCRIPT file. In some embodiments, a desktop applet includes an Extensible Markup Language (XML) file and a JAVASCRIPT file (for example, a YAHOO! desktop applet).

Combined with the RF circuit system 108, the touchscreen 112, the display system controller 156, the touch module 130, the graphic module 132, the text input module 134, and the browser module 147, the desktop applet creator module 150 may be configured to create a desktop applet by a user (for example, a user-specified part of a web page is transplanted to a desktop applet).

Combined with the touchscreen 112, the display system controller 156, the touch module 130, the graphic module 132, and the text input module 134, the searching module 151 includes an executable instruction that is used to search, according to a user instruction, the memory 102 for a text, music, a voice, an image, a video, and/or another file that matches one or more searching criteria (for example, one or more searching terms specified by the user).

Combined with the touchscreen 112, the display system controller 156, the touch module 130, the graphic module 132, the audio circuit system 110, the loudspeaker 111, the RF circuit system 108, and the browser module 147, the video and music player module 152 includes an executable instruction that allows a user to download and play back recorded music stored in one or more file formats (for example, an MP3 or advanced audio coding (AAC) file) and another voice file, and an executable instruction that is used to display, present, or play back a video in another manner (for example, on the touchscreen 112 or an external display connected using the external port 124). In some embodiments, the device 100 may include a functionality of an MP3 player.

Combined with the touchscreen 112, the display controller 156, the touch module 130, the graphic module 132, and the text input module 134, the memo module 153 includes an executable instruction that is used to create and manage a memo, a to-do task list, and the like according to a user instruction.

Combined with the RF circuit system 108, the touchscreen 112, the display system controller 156, the touch module 130, the graphic module 132, the text input module 134, the GPS module 135, and the browser module 147, the map module 154 may be configured to receive, display, modify, and store a map and map-associated data (for example, a driving route, data of a specific location, a nearby shop, and another interest point, and other location-based data) according to a user instruction.

Combined with the touchscreen 112, the display system controller 156, the touch module 130, the graphic module 132, the audio circuit system 110, the loudspeaker 111, the RF circuit system 108, the text input module 134, the email client module 140, and the browser module 147, the online video module 155 includes an instruction that allows a user to visit, browse, receive (for example, streaming receiving and/or downloading), play back (for example, on a touchscreen or an external display connected using the external port 124), send an email that has a link to a specific online video, and manage, in another manner, online videos of one or more file formats (such as H.264). In some embodiments, a link to a specific online video is sent using the instant message module 141 instead of the email client module 140.

Combined with the touchscreen 112, the display system controller 156, the touch module 130, the graphic module 132, the audio circuit system 110, the loudspeaker 111, and the microphone 113, the voice/audio recorder module 163 includes an executable instruction that allows a user to record an audio (for example, a voice) in one or more file formats (such as an MP3 or AAC file), and an executable instruction that is used to present a recorded audio file or play back a recorded audio file in another manner.

Combined with the touchscreen 112, the display system controller 156, the touch module 130, and the graphic module 132, the notification module 165 includes an executable instruction for displaying a notification or an alarm (such as a passed-in message, an incoming call, a calendar event reminder, and an application program event) on the touchscreen 112.

Each of the foregoing modules and application programs corresponds to one group of executable instructions that are in the method described in this application (for example, a method implemented using a computer and another information processing method that are described in this specification) and that are used to execute one or more functions described above. These modules (that are, instruction sets) are not necessarily implemented as separate software programs, processes, or modules. Therefore, various subgroups of these modules may be combined or re-arranged, in another manner, in various embodiments. In some embodiments, the memory 102 may store a subgroup of the foregoing modules and a data structure. In addition, the memory 102 may store another module and another data structure that are not described above.

In some embodiments, the device 100 is a device on which operations of a group of functions predefined on the device are uniquely executed using a touchscreen and/or a touchpad. A touchscreen and/or a touchpad is used as a major input control device for operation of the device 100, which may reduce a quantity of physical input control devices (such as a push button and a dial pad) on the device 100.

The predefined group of functions that are uniquely executed using a touchscreen and/or a touchpad includes navigation between user interfaces. In some embodiments, when a touchpad is touched by a user, the device 100 may navigate any user interface that can be displayed on the device 100 to a main menu, a main menu, or a root menu. In such an embodiment, a touchpad may be referred to as a "menu button". In some other embodiments, a menu button may be a physical push button or another physical input control device instead of a touchpad.

Figure 2C:
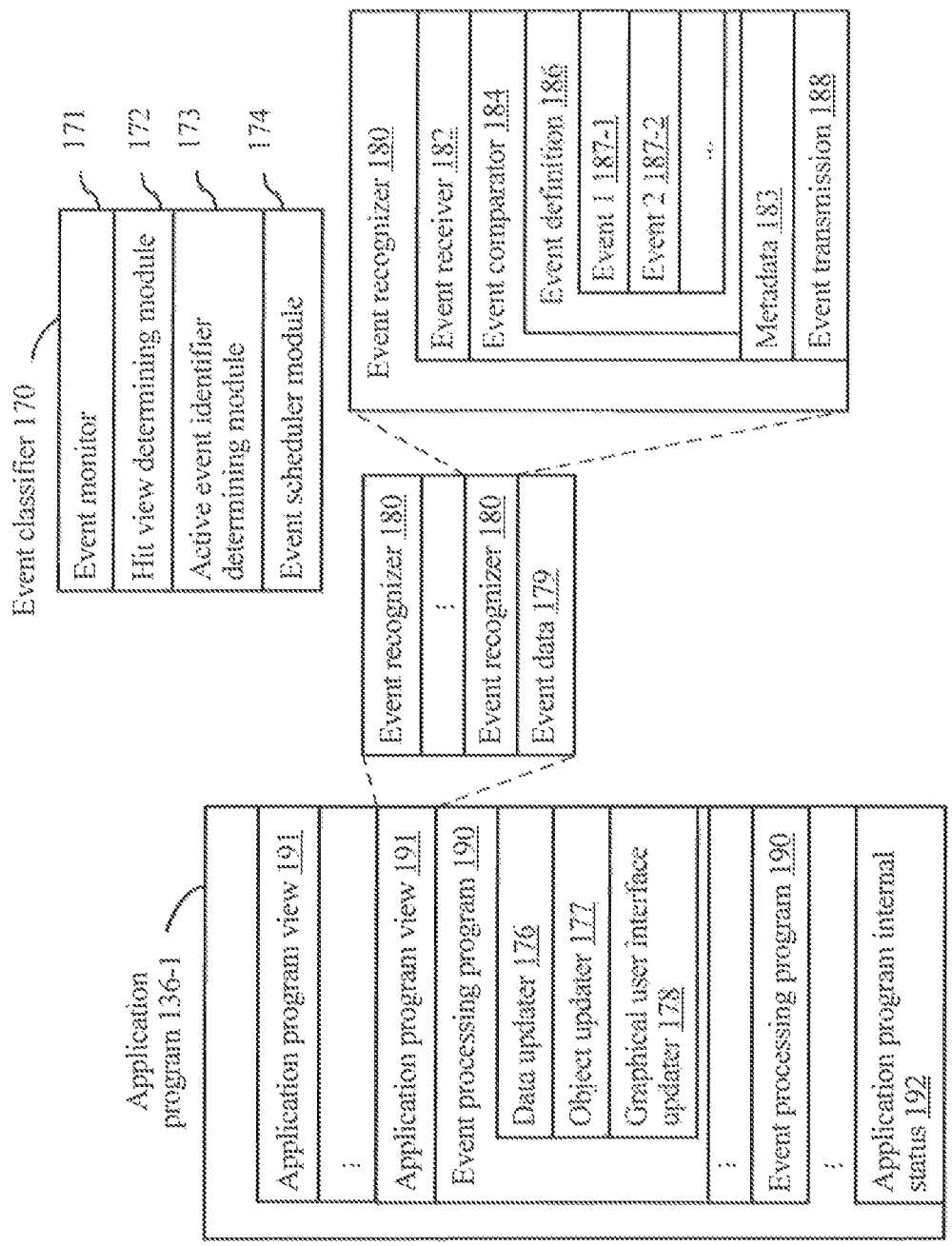
FIG. 2C is another schematic diagram of an example device according to this application.

FIG. 2C is a block diagram of an example component for event processing according to some embodiments. In some embodiments, the memory 102 (in FIG. 2A and FIG. 2B) or a memory 370 (in FIG. 3A, FIG. 3B, and FIG. 3C) includes an event classifier 170 (for example, in an operating system 126) and a corresponding application program 136-1 (for example, any application program in the application programs 137-151 and 155 described above, and application programs, such as drawing module 380, presenting module 382, word processing module 384, web page creation module 386, disk editing module 388, spreadsheet module 390).

The event classifier 170 receives event information, and determines an application program 136-1 to which the event information is to be transmitted and an application program view 191 of the application program 136-1. The event classifier 170 includes an event monitor 171 and an event scheduler module 174. In some embodiments, the application program 136-1 includes an application program internal status 192, and the application program internal status 192 indicates a current application program view displayed on the touch sensitive display 112 when an application program is active or is being executed. In some embodiments, a device/global internal status 157 is used by the event classifier 170 to determine one or more application programs that are currently active. The application program internal status 192 is used by the event classifier 170 to determine the application program view 191 to which the event information is to be transmitted.

In some embodiments, the application program internal status 192 includes other information, for example, one or more of the following information restoration information used when execution of the application program 136-1 is restored, user interface status information that indicates information that is being displayed or that is ready to be displayed by the application program 136-1, a status queue that is used to enable a user to return to a previous state or view of the application program 136-1, and a repeat/revocation queue of a previous action performed by the user.

The event monitor 171 receives event information from a peripheral device interface 118. The event information includes information about a subevent (for example, a user touch on the touch sensitive display 112, which is used as a part of a multi-touch gesture). The peripheral device interface 118 transmits information received (using an audio circuit system 110) from an I/O subsystem 106 or a sensor (such as a proximity sensor 166), an accelerometer 168, and/or a microphone 113. Information received by the peripheral device interface 118 from the I/O subsystem 106 includes information from the touch sensitive display 112 or a touch sensitive surface.

In some embodiments, the event monitor 171 sends a request to the peripheral device interface 118 at a pre-determined interval. The peripheral device interface 118 transmits event information as a response. In other embodiments, the peripheral device interface 118 transmits event information only when a significant event exists (for example, an input whose noise value is greater than a pre-determined noise threshold is received and/or an input whose duration is greater than pre-determined duration is received).

In some embodiments, the event classifier 170 further includes a hit view determining module 172 and/or an active event recognizer determining module 173.

When the touch sensitive display 112 displays more than one view, the hit view determining module 172 provides a software process for determining that a subevent has occurred in somewhere in one or more views. A view includes a control and another element that can be seen by a user on a display.

Another aspect of a user interface associated with an application program is a group of views, which is also referred to as an application program view or a user interface window in some cases in this specification. Information is displayed on the views, and a touch-based gesture appears on the views. An application program view (of a corresponding application program) on which a touch is detected may be corresponding to a programming level of the application program or a programming level in a view hierarchical structure. For example, a lowest level view on which a touch is detected may be referred to as a hit view, and an event set recognized as a correct input may be determined at least partly based on a hit view of an initial touch that begins with a touch-based gesture.

The hit view determining module 172 receives information about the subevent of the touch-based gesture. When the application program has multiple views that are organized in a hierarchical structure, the hit view determining module 172 recognizes the hit view as a lowest view that is in the hierarchical structure and that should process the subevent. In most scenarios, a hit view is a lowest level view on which a subevent (that is, a first subevent in a subevent sequence that forms an event or a potential event) occurs. After a hit view is recognized by the hit view determining module, the hit view usually receives all subevents related to a same touch or input source for which the hit view is recognized.

The active event recognizer determining module 173 determines one or more views that are in the view hierarchical structure and that should receive a specific subevent sequence. In some embodiments, the active event recognizer determining module 173 determines that only a hit view should receive a specific subevent sequence. In other embodiments, the active event recognizer determining module 173 determines that all views that include a physical location of a subevent are active views, thereby determining that all active views should receive a specific subevent sequence. In other embodiments, even if a touch subevent is completely limited to an area associated with a specific view, a higher view in the hierarchical structure remains to be an active view.

The event scheduler module 174 schedules event information to an event recognizer (for example, the event recognizer 180). In an embodiment that includes the active event recognizer determining module 173, the event scheduler module 174 transmits event information to an event recognizer determined by the active event recognizer determining module 173. In some embodiments, the event scheduler module 174 stores event information in an event queue, and the event information is retrieved by a corresponding event receiver module 182.

In some embodiments, the operating system 126 includes an event classifier 170, or the application program 136-1 includes an event classifier 170. In another embodiment, the event classifier 170 is an independent module, or a part of another module (such as the touch/movement module 130) stored in the memory 102.

In some embodiments, the application program 136-1 includes multiple event processing programs 190 and one or more application program views 191, and each of them includes an instruction that is used to process a touch event occurred on a corresponding view of a user interface of an application program. Each application program view 191 of the application program 136-1 includes one or more event recognizers 180. Generally, a corresponding application program view 191 includes multiple event recognizers 180. In other embodiments, one or more of the event recognizers 180 are a part of an independent module. The independent module is, for example, a higher-level object from which a user interface toolkit (not shown) or the application program 136-1 inherits a method and another feature. In some embodiments, a corresponding event processing program 190 includes one or more of a data updater 176, an object updater 177, a graphical user interface (GUI) updater 178, and/or event data 179 received from the event classifier 170. The event processing program 190 may use or invoke the data updater 176, the object updater 177, or the GUI updater 178 to update the application program internal status 192. Alternatively, one or more of the application program views 191 include one or more corresponding event processing programs 190. In addition, in some embodiments, one or more of the data updater 176, the object updater 177, or the GUI updater 178 are included in a corresponding application program view 191.

A corresponding event recognizer 180 receives event information (for example, the event data 179) from the event classifier 170 and identifies an event according to the event information. The event recognizer 180 includes an event receiver 182 and an event comparator 184. In some embodiments, the event recognizer 180 further includes at least a subgroup of metadata 183 and an event transmission 188 (which may include a subevent transmission instruction).

The event receiver 182 receives the event information from the event classifier 170. The event information includes information about the subevent such as a touch or a movement of a touch. According to the subevent, the event information further includes additional information such as a location of the subevent. When the subevent relates to a movement of a touch, the event information may further include a rate and a direction of the subevent. In some embodiments, an event includes that a device rotates from one orientation to another orientation (for example, from a vertical orientation to a horizontal orientation, and vice versa), and the event information includes corresponding information about a current orientation (also referred to as a device posture) of the device.

The event comparator 184 compares the event information with a pre-defined event or a subevent definition and determines, based on the comparison, the event or the subevent, or determines or updates a status of the event or the subevent. In some embodiments, the event comparator 184 includes an event definition 186. The event definition 186 includes a definition (for example, a pre-defined subevent sequence) of an event such as an event 1 (187-1), an event 2 (187-2), and the like. In some embodiments, a subevent in the event 187 includes, for example, a touch beginning, a touch end, a touch movement, a touch cancellation, and a multi-touch. In an instance, a definition of the event 1 (187-1) is double tapping on a displayed object. For example, the double tapping includes a first touch of preset duration on the displayed object (the touch beginning), a first uplift of preset duration (the touch end), a second touch of preset duration on the displayed object (the touch beginning), and a second uplift of preset duration (the touch end). In another instance, a definition of the event 2 (187-2) is dragging on a displayed object. For example, the dragging includes a touch (or contact) of preset duration on a displayed object, a movement of the touch on the touch sensitive display 112, and an uplift of the touch (a touch end). In some embodiments, an event further includes information about one or more associated event processing programs 190.

In some embodiments, the event definition 187 includes a definition of an event that is used for a corresponding user interface object. In some embodiments, the event comparator 184 executes a hit test to determine a user interface object that is associated with a subevent. For example, application program views of three user interface objects are displayed on the touch display 112. When a touch is detected on the touch sensitive display 112, the event comparator 184 executes a hit test to determine an object that is in the three user interface objects and that is associated with the touch (subevent). If each displayed object is associated with a corresponding event processing program 190, the event comparator uses a result of the hit test to determine an event processing program 190 that should be activated. For example, the event comparator 184 selects an event processing program that is associated with an object and a subevent that trigger the hit test.

In some embodiments, a definition of a corresponding event 187 further includes a delay action. Transmission of action delay event information is delayed till it is determined that a subevent sequence is indeed corresponding to or is not corresponding to an event type of an event recognizer.

When the corresponding event recognizer 180 determines that a subevent string does not match any event in the event definition 186, the corresponding event recognizer 180 enters an event impossible state, an event failure state, or an event end state, and then ignores a subsequent subevent of the touch-based gesture. In this case, another event recognizer (if existing) that recognizes an active hit view continues to track and process an ongoing subevent of the touch-based gesture.

In some embodiments, the corresponding event recognizer 180 includes metadata 183 of a configurable attribute, flag, and/or list that can instruct an event transmission system to execute transmission of a subevent of an active event recognizer. In some embodiments, the metadata 183 includes a configurable attribute, flag, and/or list that indicates a manner in which event recognizers may perform interaction. In some embodiments, the metadata 183 includes a configurable attribute, flag, and/or list that indicates whether a subevent is transmitted to a view, or configurable attributes, flags, and/or lists of various levels in a programming hierarchical structure.

In some embodiments, when one or more specific subevents of an event are recognized, the corresponding event recognizer 180 activates an event processing program 190 associated with the event. In some embodiments, the corresponding event recognizer 180 transmits event information associated with the event to the event processing program 190. Activating the event processing program 190 is different from sending (and delayed sending) of a subevent to a corresponding hit view. In some embodiments, the event recognizer 180 sends a flag associated with a recognized event, and an event processing program 190 associated with the flag receives the identifier and executes a pre-defined process.

In some embodiments, the event transmission instruction 188 includes transmitting event information of a subevent and skipping activating a subevent transmission instruction of an event processing program. On the contrary, the subevent transmission instruction transmits the event information to an event processing program associated with a subevent string or to an active view. The event processing program associated with the subevent string or an event processing program associated with the active view receives the event information and executes a pre-determined process.

In some embodiments, the data updater 176 creates and updates data used in the application program 136-1. For example, the data updater 176 updates a phone number used in the contact module 137 or a video file stored in the video player module 145 for use. In some embodiments, the object updater 176 creates and updates an object used in the application program 136-1. For example, the object updater 177 creates a new user interface object or updates a location of a user interface object. The GUI updater 178 updates a GUI. For example, the GUI updater 178 prepares display information and sends the display information to the graphic module 132 in order to display the display information on a touch sensitive display.

In some embodiments, the event processing program 190 includes or has a permission to access the data updater 176, the object updater 177, and the GUI updater 178. In some embodiments, the data updater 176, the object updater 177, and the GUI updater 178 are included in a single module of a corresponding application program 136-1 or a corresponding application program view 191. In other embodiments, the data updater 176, the object updater 177, and the GUI updater 178 are included in two or more software modules.

It should be understood that foregoing discussion on event processing of a user touch on the touch sensitive display is also applicable to a user input (some of which are not initiated on a touchscreen) in which an operation is performed on the electronic device 100 in another manner using an input device, for example, coordination of a mouse movement and a mouse button push (having or having no single or multiple keyboard pushes or holding), a user movement, tapping, dragging, rolling, and the like on the touchpad, a stylus input, a movement of a device, an oral instruction, a detected eye movement, a biological feature input, and/or any combination thereof, and they may be used as an input corresponding to a subevent that defines a to-be-recognized event.

Figure 3A:
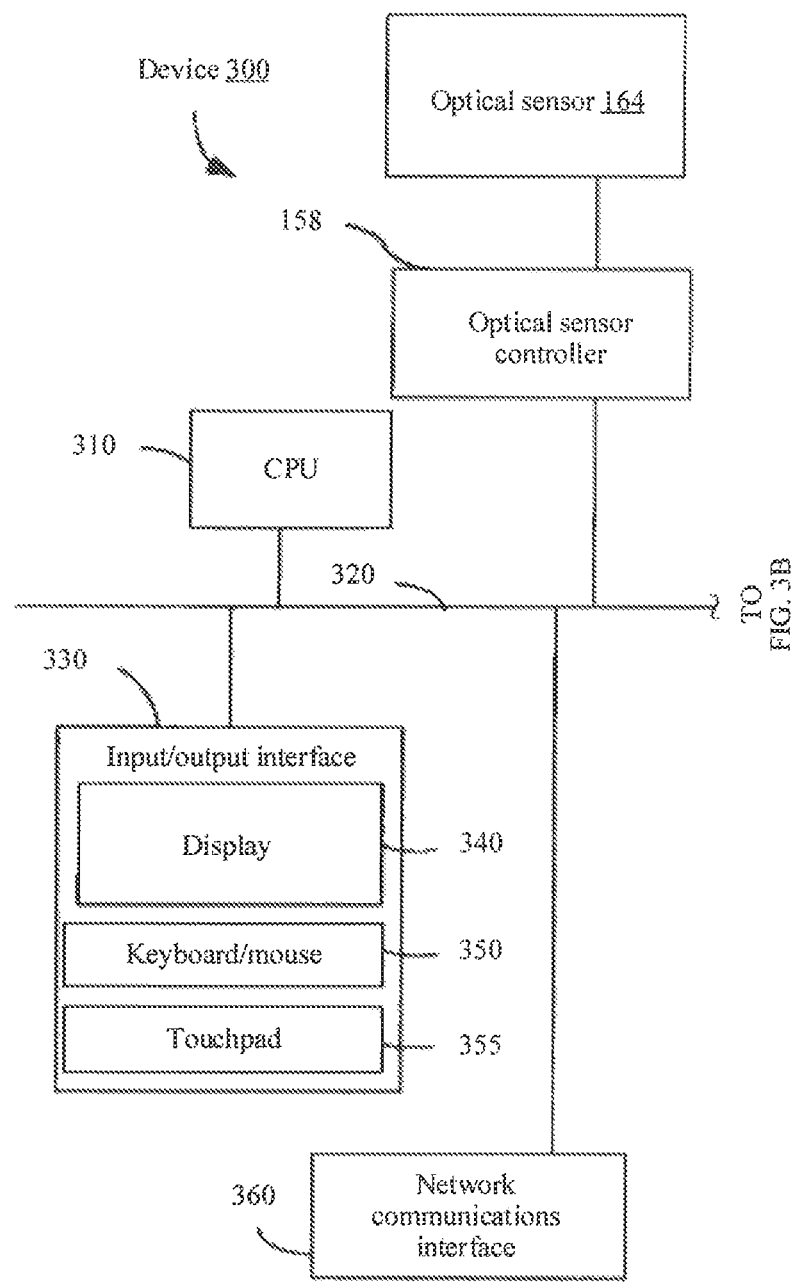
Figure 3B:
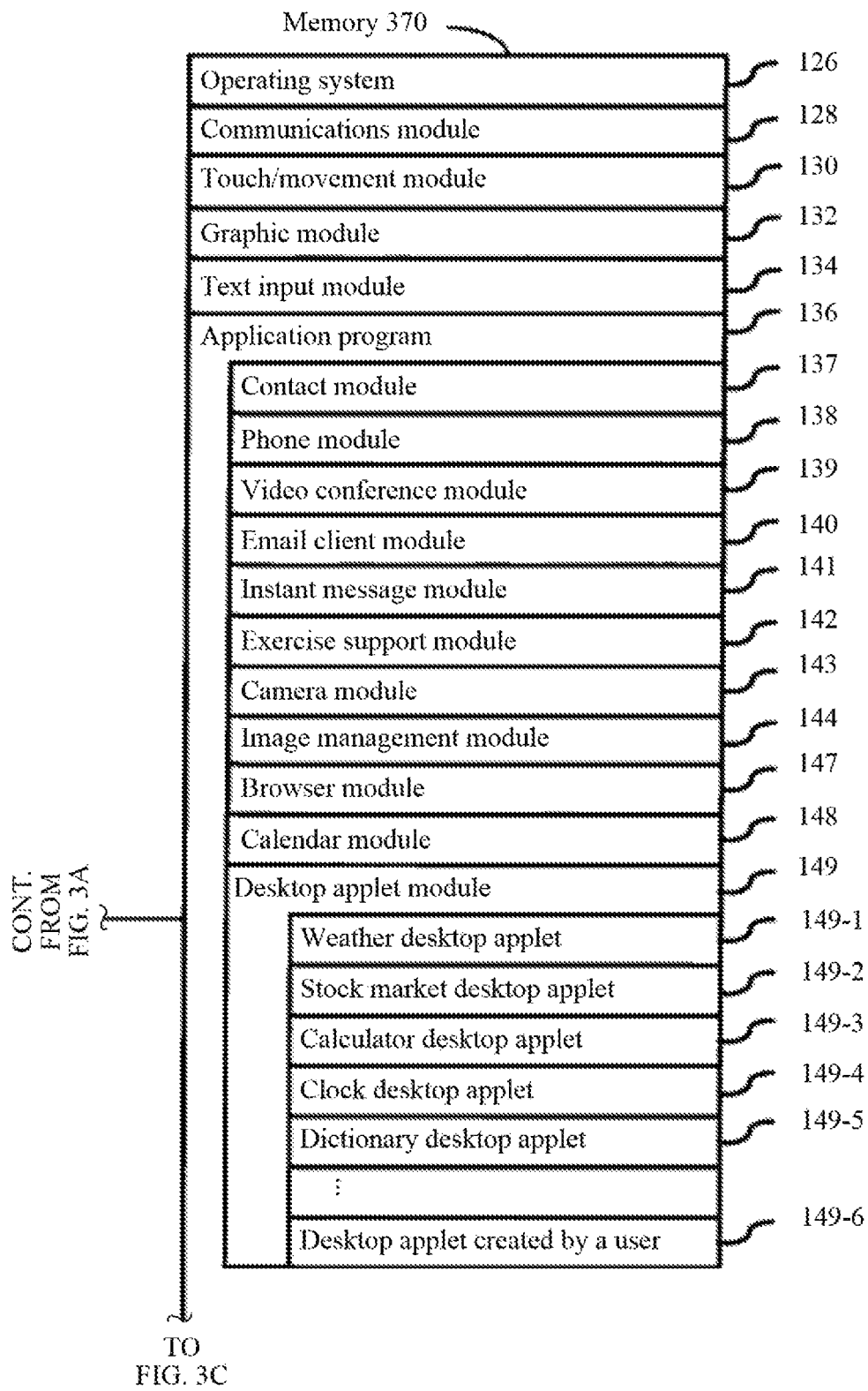

FIG. 3A, FIG. 3B, and FIG. 3C are a block diagram of an example electronic device that has a display and a touch sensitive surface according to some embodiments. A device 300 may not be portable. In some embodiments, the device 300 is a laptop computer, a desktop computer, a tablet computer, a multimedia player device, a navigation device, an education device (such as a children's learning toy), a game system, or a control device (for example, a household controller or an industrial controller). The device 300 generally includes one or more CPU 310, one or more networks, or another communications interface 360, a memory 370, and one or more communications buses 320 that interconnect these components. In some embodiments, the CPU 310 includes an image signal processor and a dual-core or multicore processor. The communications bus 320 may include a circuit system (referred to as a chip set in some cases) that interconnects system components and controls communication between the system components. The device 300 includes an I/O interface 330 that has a display 340, and the display 340 is generally a touchscreen display. The I/O interface 330 may further include a keyboard and/or a mouse (or another pointing device) 350 and a touchpad 355. The device 300 further includes an optical sensor 164 and an optical sensor controller 158. The memory 370 includes a high-speed random access memory, such as a dynamic RAM (DRAM), a static RAM (SRAM), a double data rate (DDR) RAM or another random access solid-state storage device, and may also include a non-volatile memory, such as one or more magnetic disk storage devices, an optical disc storage device, a flash memory device, or another non-volatile solid-state storage device. Optionally, the memory 370 may include one or more storage devices that are remotely located from a CPU 310. In some embodiments, the memory 370 stores a program, a module, and a data structure that are similar to a program, a module, and a data structure, which are stored in a memory 102 of a portable electronic device 100, or a subgroup thereof. In addition, the memory 370 may store another program, module, and data structure that do not exist in the memory 102 of the portable electronic device 100. For example, the memory 370 of the device 300 my store a drawing module 380, a presenting module 382, a word processing module 384, a web page creation module 386, a disk editing module 388, and/or a spreadsheet module 390. However, a memory 102 of the portable electronic device 100 may not store these modules.

Each of the foregoing recognized elements in FIG. 3A, FIG. 3B, and FIG. 3C may be stored in one or more storage devices mentioned above. Each of the foregoing recognized modules corresponds to one group of instructions that are used to implement the foregoing function. The foregoing recognized modules or programs (that are, instruction sets) are not necessarily implemented as standalone software programs, processes, or modules. Therefore, various subgroups of these modules may be combined or re-arranged, in another manner, in various embodiments. In some embodiments, the memory 370 may store a subgroup of the foregoing modules and a data structure. In addition, the memory 370 may store another module and data structure that are not described above.

Figure 4:
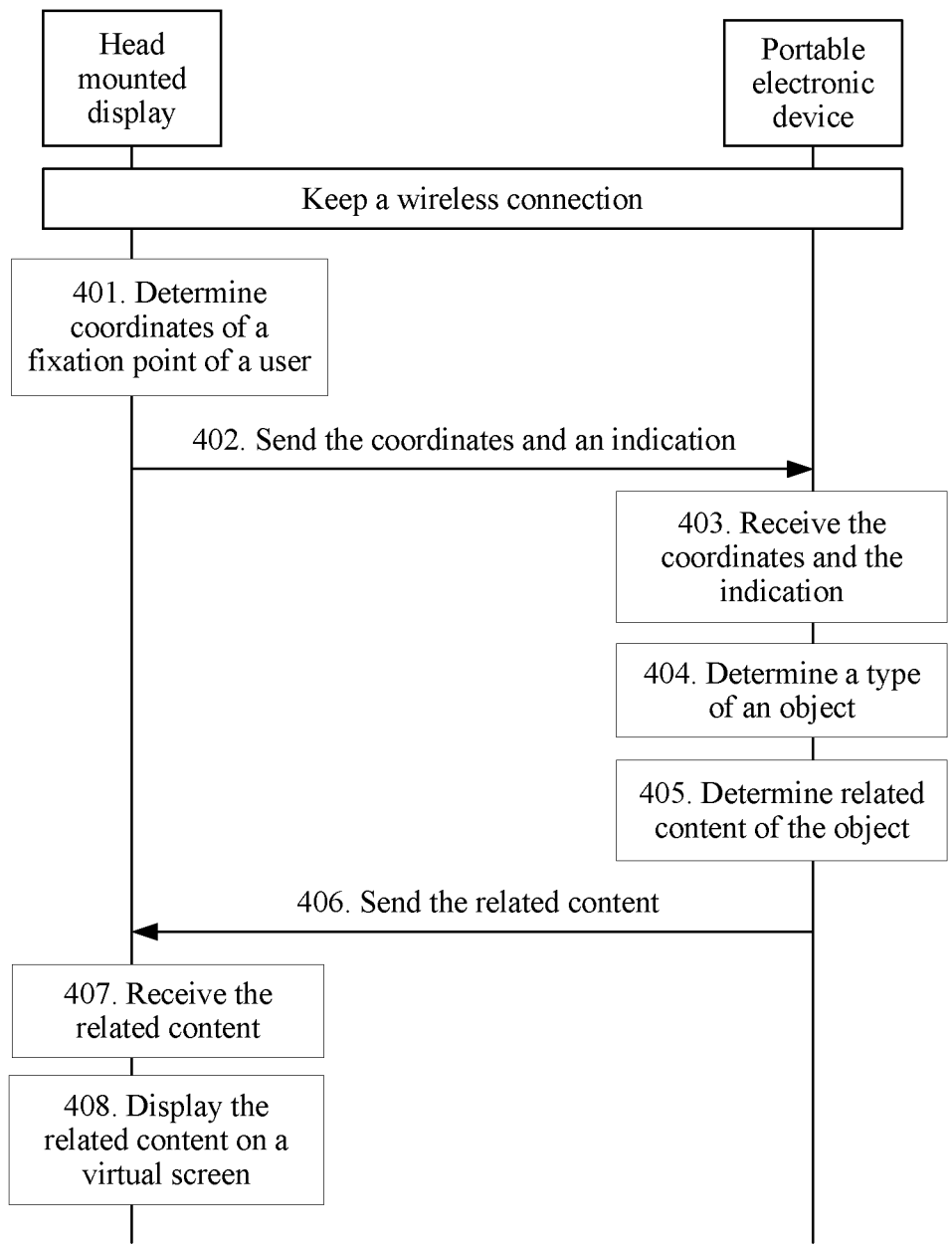
FIG. 4 is a schematic flowchart of a display method according to this application.

Referring to FIG. 4, this application discloses a display method, where a head mounted display keeps a wireless connection to a portable electronic device, and the method includes the following steps.

Step 401. The head mounted display detects an instruction and determines coordinates of a fixation point of a user on a screen of the portable electronic device.

When the user needs to preview an application or view information about an object on the screen of the portable electronic device using the head mounted display, the user needs to focus a line of sight on a target location on the screen of the portable electronic device. The line of sight focus of the user is the fixation point of the user. The head mounted display has an eye tracking function such that the coordinates on the screen of the portable electronic device can be determined according to the line of sight focus of the user. When the user needs to perform a required operation on a target, an operation instruction needs to be inputted, for example, a voice instruction or a gesture instruction in order to trigger the head mounted display and the portable electronic device to perform a corresponding operation according to the operation instruction. It should be noted that a gesture in a gesture instruction may be a three-dimensional space gesture, for example, a hand gesticulates a circle, a "Z" shape, or the like, in the front of the head mounted display. A mapping table that is between a gesture and a corresponding instruction is set in the head mounted display, and after receiving a gesture form, the head mounted display obtains a corresponding gesture instruction from the mapping table.

Step 402. The head mounted display sends the coordinates and an indication to the portable electronic device, where the indication is used to identify the instruction.

After the head mounted display determines the coordinates, the coordinates need to be sent to the portable electronic device such that the portable electronic device performs a related operation according to the trigger instruction and the coordinates. The indication may be a number or a symbol, or may be a text obtained by means of conversion after recognizing a user voice instruction, such as preview or search. If the indication is a number or a symbol, the portable electronic device stores a function mapping table corresponding to the indication. For example, an indication "1" corresponds to a "preview" command in the mapping table.

In another possible implementation, the head mounted display sends only the coordinates to the portable electronic device, and the portable electronic device per-agrees a related execution manner for each type of an object. After receiving the coordinates, the portable electronic device determines a type of an object corresponding to the coordinates in order to perform a pre-agreed related operation.

Step 403. The portable electronic device receives the coordinates or both the indication and the coordinates sent by the head mounted display, where the coordinates are coordinates of the fixation point of the user on the screen of the portable electronic device.

Step 404. When an object corresponding to the coordinates is manipulable, the portable electronic device determines a type of the object.

For example, if the object is an application program (also referred to as App), the portable electronic device may run the App, if the object is a folder, the portable electronic device may open the folder, or if the object is a person or an object in a picture or video, the portable electronic device may recognize and query the person or object. If the object is a single-color background image that is set by the portable electronic device, or is a blank location in some applications, such an object is not manipulable by the portable electronic device.

Step 405. The portable electronic device determines related content of the object according to a type of the object.

The related content is related result information obtained after the portable electronic device performs a related operation on the manipulable object. For example, image information of a picture is obtained after an object of a picture type is opened, and the image information is related content of the object.

In a possible implementation, after determining a type of the object, the portable electronic device performs a related operation on the object according to a received indication message sent by the head mounted display. For example, if the object corresponding to the coordinates is a folder, and an operation indicated by the indication message is a preview, the portable electronic device performs a preview operation on the folder, and uses a previewed image as the related content.

In another possible implementation, after determining a type of the object, the portable electronic device performs a related operation on the object according to a pre-agreed operation manner. For example, if the portable electronic device pre-agrees that the object corresponding to the coordinates is of a folder type, the portable electronic device performs a preview operation on the folder, and uses a previewed image as the related content.

In another possible implementation, the portable electronic device includes a voice recognition module. When the user sends a voice instruction, the portable electronic device detects the voice instruction according to the voice recognition module. When the portable electronic device determines that the voice instruction is for instructing the head mounted display and the portable electronic device to perform a display operation, for example, the voice instruction is "preview", the portable electronic device may convert the voice instruction into a text and use the text as an input of the object.

Step 406. The portable electronic device sends the related content to the head mounted display.

After obtaining the related content of the object corresponding to the coordinates, the portable electronic device sends the related content of the object to the head mounted display.

Step 407. The head mounted display receives related content of an object corresponding to the coordinates sent by the portable electronic device, where the related content is obtained by the portable electronic device according to the coordinates and the indication.

Step 408. The head mounted display displays the related content on a virtual screen corresponding to the portable electronic device.

When the user wears the head mounted display, the user can see a virtual screen obtained by means of projection by the head mounted display, and the head mounted display displays obtained related content of the object on the virtual screen for the user to browse.

A location of the virtual screen corresponding to the portable electronic device is determined according to three-dimensional coordinates that are of the portable electronic device in a three-dimensional coordinate system and that are obtained by the head mounted display, and the three-dimensional coordinates of the portable electronic device are continuously tracked. Therefore, according to a screen obtained by means of projection by the three-dimensional coordinates, the virtual screen may be a screen that can be seen by the user using the head mounted display, or be a display area that is obtained by means of division and that is set by the head mounted display. The display area may not be seen by the user. Content seen by the user using the head mounted display is the related content of the object obtained on the virtual screen that is obtained by means of projection by the head mounted display.

Because a floating preview function that is based on a current floating touch technology cannot provide better user experience, this application provides a display method, including obtaining, by a head mounted display, a trigger instruction and determining coordinates of a line of sight focus of the user on a screen of a portable electronic device, where the trigger instruction is used to instruct the head mounted display to perform a display operation, sending the coordinates to the portable electronic device, when the coordinates trigger the portable electronic device to determine that an object corresponding to the coordinates can be processed by the portable electronic device, obtaining, by the portable electronic device, related content of the object, obtaining the related content of the object of the portable electronic device, and displaying the related content of the object on a virtual screen. In this way, the user browses, by means of information exchange between the head mounted display and the portable electronic device, information presented on the portable electronic device such that a preview manner is more natural and convenient, thereby improving user experience. In addition, if the portable electronic device is a terminal device with a relatively small screen, such as a smart watch, using the method provided in this application, the user can more conveniently read content on the smart watch using a head mounted display, thereby improving user experience.

For a process of determining the coordinates of the fixation point of the user on the screen of the portable electronic device, it should be noted that before the user uses the head mounted display for the first time, calibration needs to be performed in advance. For example, a user wears a head mounted display, and places the portable electronic device in front of the line of sight in a specific distance, the user gazes at four corners of the screen (or several specific points on an edge of a screen if the screen is circular or of another shape) of the portable electronic device according to prompt information such that the head mounted display can precisely locate coordinates of a line of sight focus on the portable electronic device subsequently.

Figure 5:
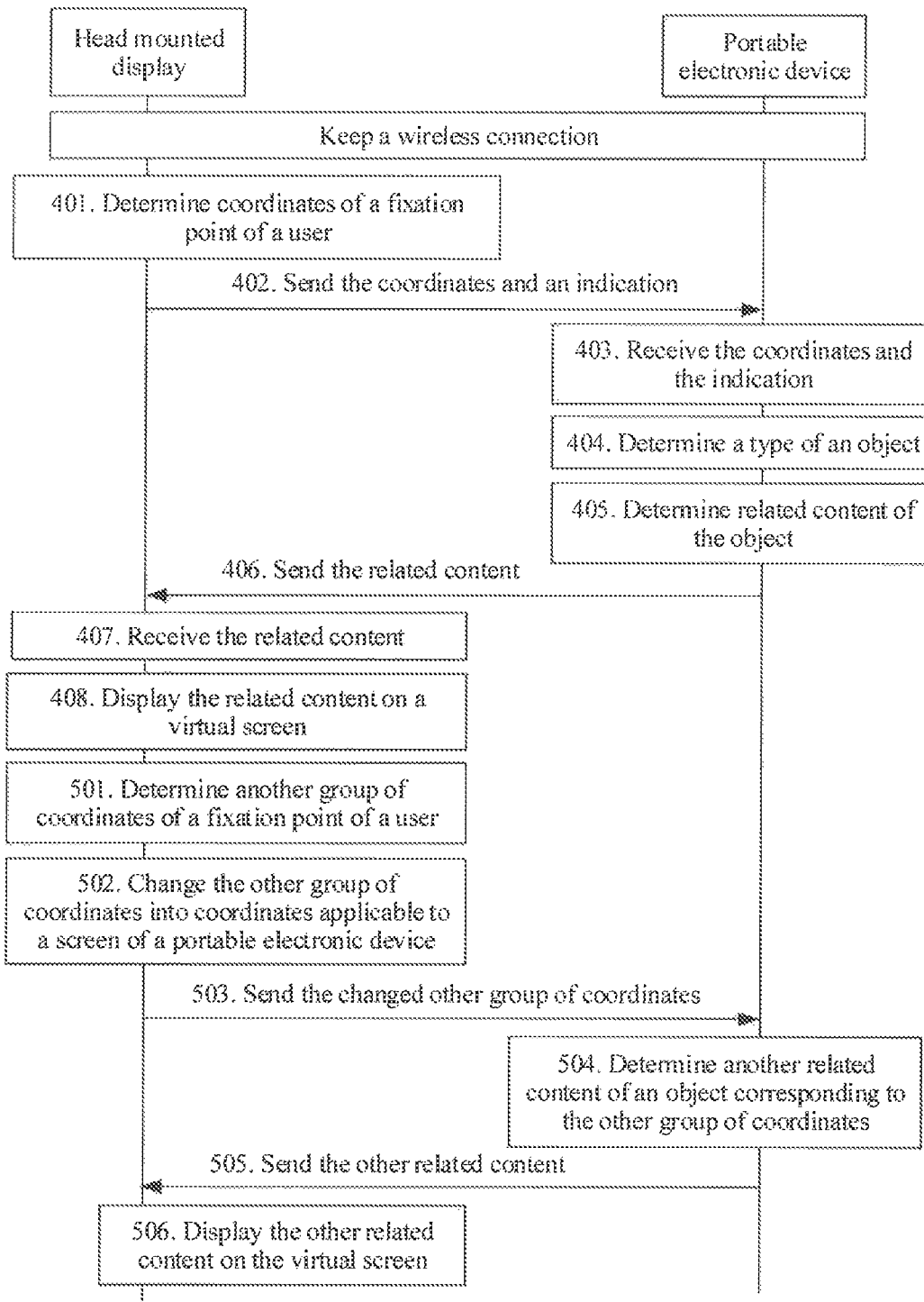
FIG. 5 is another schematic flowchart of a display method according to this application.

With reference to an embodiment in FIG. 4, optionally, referring to FIG. 5, the related content of the object corresponding to the coordinates includes a screenshot of a preset range on the screen of the portable electronic device.

In a possible implementation, the method includes the following steps.

Step 501. The head mounted display determines another group of coordinates of the fixation point of the user on the screenshot displayed on the virtual screen.

Step 502. The head mounted display changes the other group of coordinates into coordinates applicable to the screen of the portable electronic device.

Step 503. The head mounted display sends the changed other group of coordinates to the portable electronic device.

Step 504. The portable electronic device determines another related content of an object corresponding to the changed other group of coordinates.

Step 505. The portable electronic device sends the other related content of the object corresponding to the other group of coordinates.

Step 506. The head mounted display receives another related content of an object corresponding to the changed other group of coordinates sent by the portable electronic device, and displays the other related content on the virtual screen corresponding to the portable electronic device.

The user may send different voice instructions according to requirements, for example, a "translate" voice instruction. The head mounted display or the portable electronic device determines a type of a screen element corresponding to the coordinates, and if the screen element is text information, a text corresponding to a focus location is translated (for example, a foreign word is translated into Chinese, or a Chinese character is translated into a preset foreign word) to obtain text information after the translation.

Figure 10:
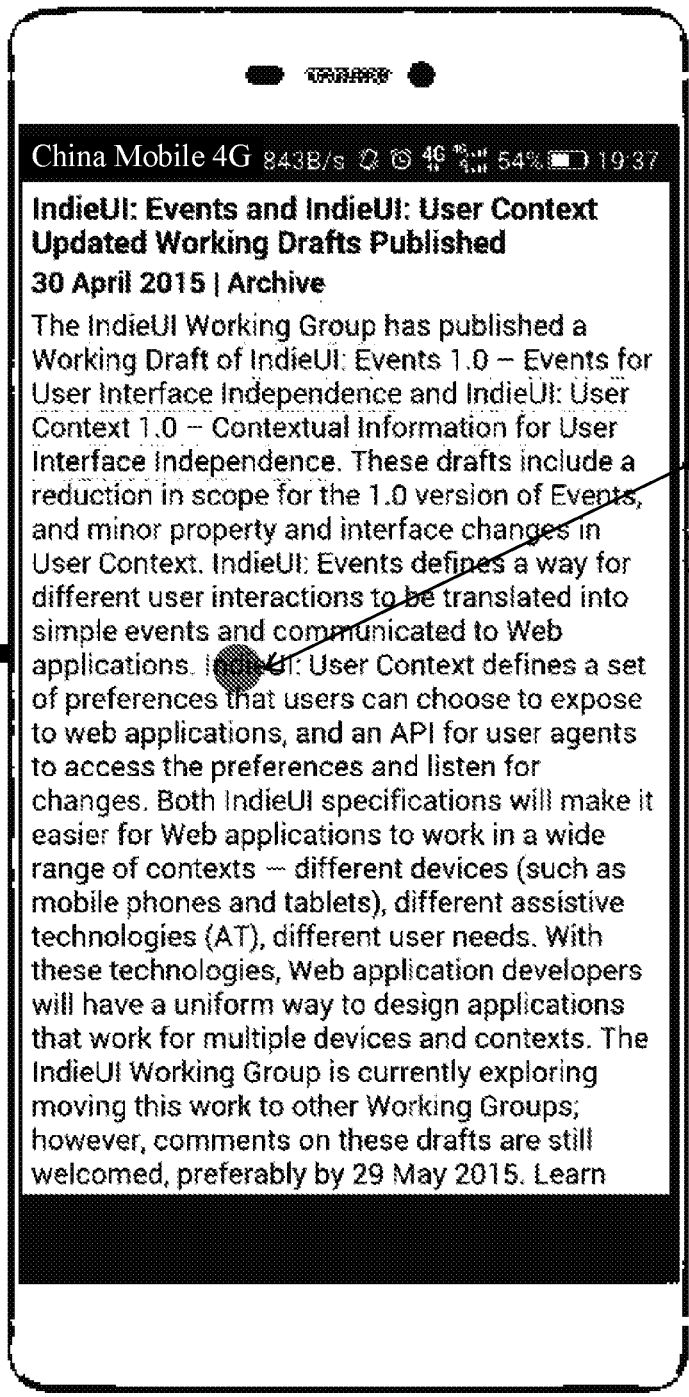
FIG. 10 is a schematic diagram of another application scenario of a display method according to this application.

In an application scenario shown in FIG. 10, the portable electronic device is a mobile phone, an AR virtual screen obtained by means of projection by the head mounted display is on the left of a screen of the mobile phone. A virtual screen shown in the figure is a screen area that is obtained by means of division by the head mounted display and that cannot be seen by the user using the head mounted display. The user speaks a voice "translate", and the head mounted display detects that a line of sight focus of the user is on an English word "Indie" on the screen of the mobile phone such that the head mounted display sends coordinates of the line of sight focus of the user to the mobile phone. The mobile phone determines, according to the coordinates, that an object is the English word "Indie", and the mobile phone translates the English word "Indie" and sends result information of the translation to the head mounted display. The head mounted display displays the result information of the translation on the virtual screen.

However, because precision of eye tracking is limited, for a text with a relatively small font-size, a specific letter or word may not be directly and precisely located. Therefore, this application provides a second-time selection solution, that is, the portable electronic device sends, to the head mounted display, an area screenshot corresponding to the first focus location. The user performs second-time line of sight focus locating on an enlarged area screenshot on the virtual screen, and then changes coordinates of a second focus location into coordinates applicable to the mobile phone, and further sends the changed coordinates to the mobile phone in order to implement precise selection, and then perform corresponding translation.

It should be noted that the virtual screen that is corresponding to the mobile phone and that is obtained by means of projection by the head mounted display may be obtained by means of projection before related content of an object that needs to be displayed is obtained, or the virtual screen may also be obtained by means of projection after related content of an object that needs to be displayed is received, and the related content of the object is displayed on the virtual screen.

Figure 6:
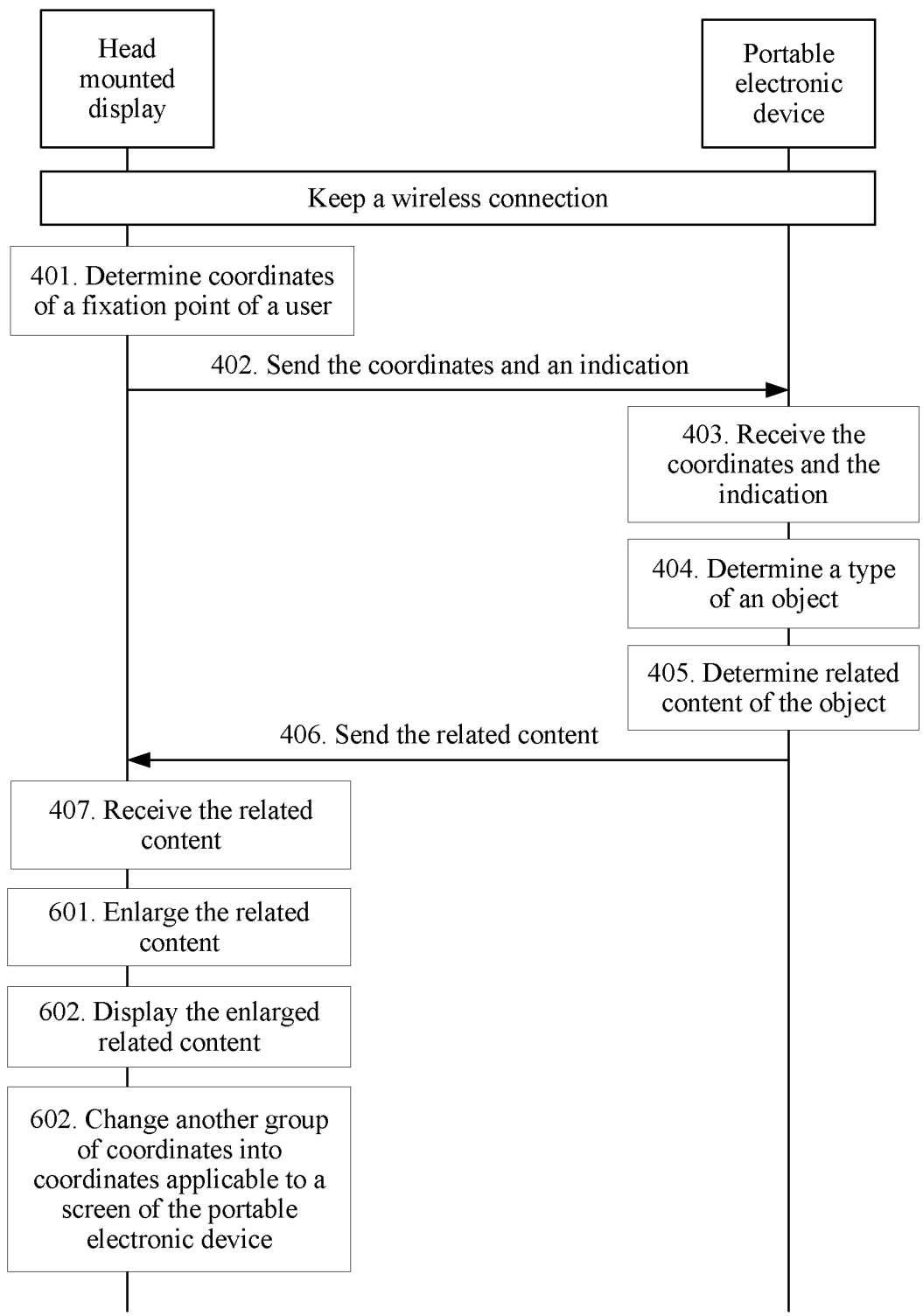
FIG. 6 is another schematic flowchart of a display method according to this application.

With reference to an embodiment in FIG. 4, optionally, referring to FIG. 6, before the displaying the related content on a virtual screen corresponding to the portable electronic device, the method further includes the following steps.

Step 601. Enlarge the related content according to a preset multiple.

The displaying the related content on a virtual screen corresponding to the portable electronic device in step 408 includes the following step.

Step 602. Display the enlarged related content on the virtual screen corresponding to the portable electronic device.

Because the portable electronic device may have a relatively small screen, such as a smart watch, the user cannot browse clear information on a screen of the smart watch, such as a picture. However, a virtual screen is obtained by means of projection by the head mounted display, and a size of the virtual screen may be adjusted using the head mounted display such that in the method provided in this application, the head mounted display enlarges received related content for displaying in order to display the enlarged related content on the virtual screen such that the user may implement more clear browsing, thereby improving user experience.

In another possible implementation, the head mounted display may further display all the related content on the virtual screen that is corresponding to the portable electronic device and on which preset zooming is performed.

Because a screen of the portable electronic device may be relatively small, such as a smart watch, the user cannot browse complete information, such as a short message service message, using a screen of the smart watch. Because a display screen of the screen of the smart watch is relatively small, content of a short message service message may not be entirely displayed on the display screen, affecting user experience. Therefore, in the method provided in this application, preset zooming may be performed on the virtual screen to enlarge the display screen of the virtual screen such that all related content can be displayed on the virtual screen in order to improve user experience.

Figure 7:
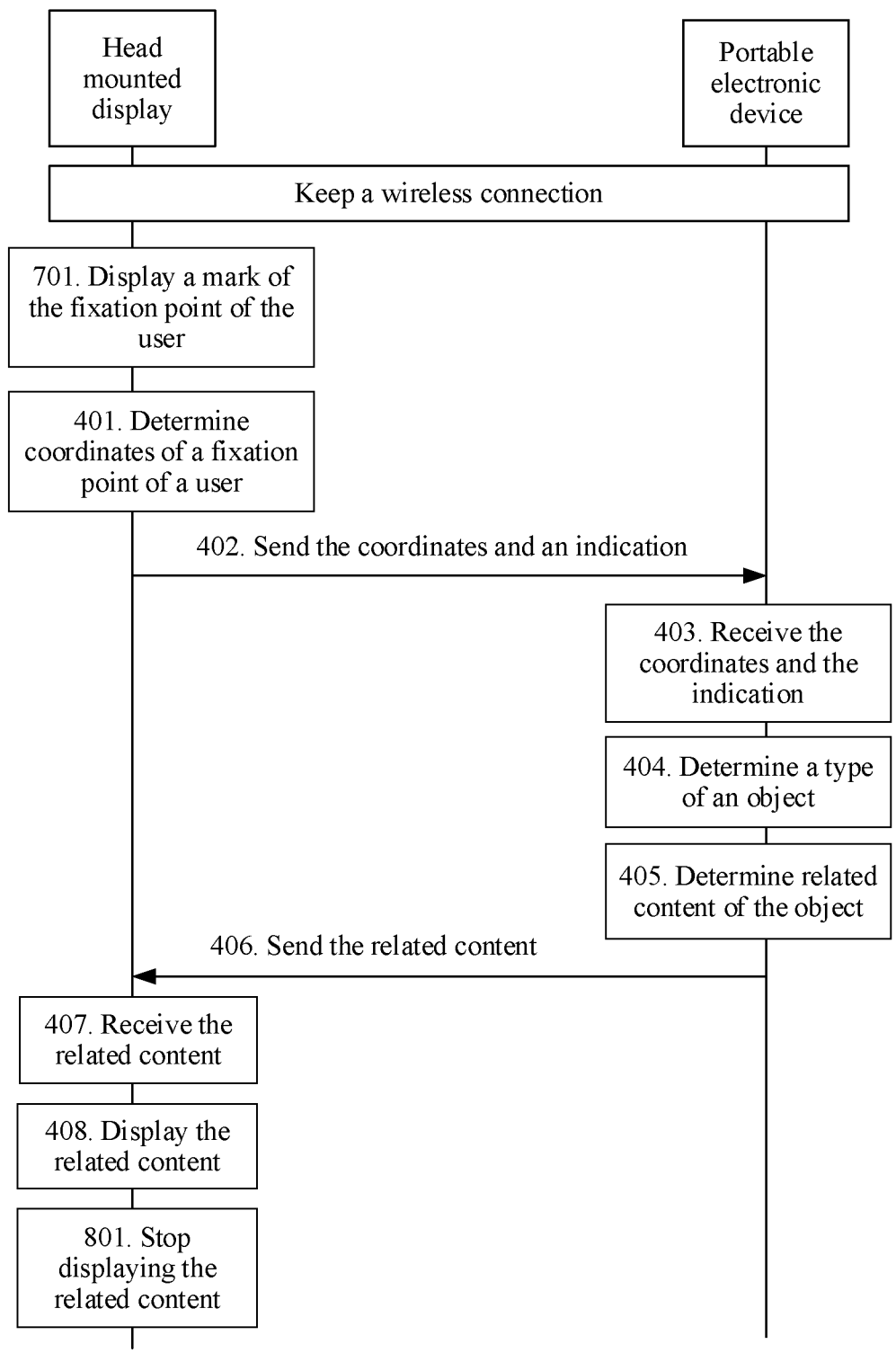
FIG. 7 is another schematic flowchart of a display method according to this application.

With reference to an embodiment in FIG. 4, optionally, referring to FIG. 7, the method further includes the following steps.

Step 701. Display a mark of the fixation point of the user on at least one of the screen of the portable electronic device or the virtual screen.

A picture of the virtual screen obtained by means of projection by the head mounted display is an enlarged, a narrowed, or an equal picture that is projected by a picture on a display buffer area of the portable electronic device or that is projected by a screen picture displayed by the portable electronic device. The head mounted display obtains three-dimensional coordinates of the portable electronic device in a three-dimensional coordinate system, and continuously tracks the three-dimensional coordinates of the portable electronic device in order to ensure that the displayed virtual screen can always follow the portable electronic device and be displayed near the portable electronic device. Further, an imaging plane of the virtual screen always coincides with a plane on which the screen of the portable electronic device is located. The head mounted display includes an eye tracking module, and when the eye tracking module detects that the fixation point of the user is in an area or stays at a point for a time exceeding a preset threshold (such as 2 seconds (s)), the head mounted display sends location coordinates of a current fixation point to the portable electronic device. To help the user determine a location of the fixation point of the user, the mark of the fixation point of the user is displayed on at least one of the screen of the portable electronic device or the virtual screen. The mark may be a red spot. When the eye tracking module detects that the fixation point of the user is in an area or stays at a point for a time exceeding a preset threshold (such as 2 s), the mark of the fixation point, that is, the red spot, may blink for one time in this case such that the user knows that this target object is selected.

Because a current eye tracking technology is not precise enough, an eye tracking module of a head mounted display may not detect a slight movement of a user's eyeball such that a line of sight focus of the user determined by the head mounted display is not precise. Therefore, in this application, the head mounted display may project a tracked point on a virtual screen, and a location of the tracked point on the virtual screen is a line of sight focus of the user detected by the eye tracking module in the head mounted display. Therefore, the user may determine, using the tracked point on the virtual screen, whether the focus determined by the head mounted display is a location desired by the user. The user may also saccade, on the basis of the tracked point on the virtual screen, an eyeball to adjust the location of the tracked point.

With reference to an embodiment in FIG. 4, optionally, referring to FIG. 7, the method further includes the following steps.

Step 801. The head mounted display detects another instruction and stops displaying the related content on the virtual screen, or closes the virtual screen, where the other instruction is used to instruct the head mounted display and the portable electronic device to perform an operation of stop displaying the related content.

The head mounted display stops content presentation on the virtual screen or directly closes the virtual screen after detecting a voice instruction that instructs the head mounted display and the portable electronic device to perform an operation of stop displaying the related content of the object, such as a "preview end" instruction.

After detecting another instruction, the head mounted display may further send a stop instruction to the portable electronic device to instruct the portable electronic device to stop obtaining the related content of the object.

The head mounted display may further send a specific mode stop instruction such as a PREVIEW_MODE_END instruction to the portable electronic device at the same time when the head mounted display stops content presentation on the virtual screen or directly closes the virtual screen. After receiving the instruction, the portable electronic device stops a corresponding mode or process and returns a success response message.

The stop instruction that is sent by the head mounted display and that is received by the portable electronic device is used to instruct the portable electronic device to stop obtaining the related content of the object.

When receiving the stop instruction sent by the head mounted display, the portable electronic device no longer sends the related content of the object to the head mounted display.

Another instruction detected by the head mounted display is described above such that the stop instruction is sent to the portable electronic device. In another possible implementation, the portable electronic device may also detect another instruction and send a stop instruction to the head mounted display such that the head mounted display stops content presentation on a virtual screen or directly closes a virtual screen. In another possible implementation, the head mounted display and the portable electronic device may simultaneously detect another instruction such that the head mounted display and the portable electronic device do not need to send a stop instruction to each other but only need to stop respective operations.

With reference to an embodiment in FIG. 4, optionally, that the portable electronic device determines related content of the object according to a type of the object includes the following implementations.

In a possible implementation, if the type of the object is a picture thumbnail, an open operation is performed on the object, and content obtained after the open operation is used as the related content of the object.

The portable electronic device may open the object in a background. A screen of the object is not presented in a foreground of the portable electronic device, that is, not presented on the screen of the portable electronic device, but presented in the display buffer area of the portable electronic device. A performed screenshot is also a screenshot performed on the display buffer area.

In another possible implementation, if the type of the object is a video thumbnail, an open operation or a play operation is performed on the object, and content obtained after the open operation or the play operation is used as the related content of the object.

The portable electronic device determines that the type of the object is the video thumbnail such that the portable electronic device may establish a media stream channel to the head mounted display, and upload the related content of the object to the head mounted display using the media stream channel.

The portable electronic device obtains (or locates) a corresponding video file when obtaining the object corresponding to the coordinates and determining that the type of the object is a thumbnail of a video file. The portable electronic device initiates a media channel negotiation process to the head mounted display in order to establish a channel that may play a video media stream in real time. For example, the SIP or the Real Time Streaming Protocol (RTSP) is used to negotiate about a Real-time Transport Protocol (RTP) media stream channel. Alternatively, the portable electronic device sends a local Hypertext Transfer Protocol (HTTP) uniform resource locator (URL) of the video file to the head mounted display, and the head mounted display downloads and plays the video media stream in an HTTP manner in real time. A progressive HTTP download manner may further be used to implement playing during downloading, and played content overwrites previously downloaded content. The head mounted display displays an AR virtual screen near the screen of the portable electronic device, and presents the video stream on the virtual screen. During video playing, the user may control a playing speed of the video using a voice instruction, and implement operations such as fast-forward, rewind, and pause. A corresponding voice control instruction monitored by the head mounted display is sent to a screen-based portable electronic device in real time such that the screen-based portable electronic device performs corresponding control over a current video media stream.

In another possible implementation, if the type of the object is a folder or a directory, an open operation is performed on the object, a screenshot of content obtained after the open operation is taken, and the screenshot is used as the related content of the object.

In another possible implementation, if the type of the object is a hyperlink, an open operation or a loading operation is performed on the object, a screenshot of content obtained after the open operation or the loading operation is taken, and the screenshot is used as the related content of the object.

In another possible implementation, if the type of the object is an application icon, an open operation is performed on the object, and content obtained after the open operation is used as the related content of the object.

Before obtaining the related content of the object, the portable electronic device first determines a type of a screen element corresponding to the object. If the type is an icon of an App, the App is opened in the background, and a screenshot of a screen obtained after the App is open is taken. The screenshot may be a screenshot of an entire screen, or a partial screenshot may also be taken (for example, a screenshot of a screen of an unread message is taken to recognize the unread message). If the type of the screen element corresponding to the object is a hyperlink or an element that has a hyperlink attribute, a linked page may be obtained and a screenshot of the linked page may be taken. The portable electronic device sends screenshot content to the head mounted display, and the head mounted display displays the screenshot content on the virtual screen.

In another possible implementation, if the type of the object is a character or a text, at least one operation of a searching operation and a translation operation is performed on the object, and content obtained after the at least one operation is used as the related content of the object.

In another possible implementation, if the type of the object is a picture or an image, image recognition is performed on the object, a searching operation is performed on a recognized face or a recognized object, and content obtained after the searching operation is used as the related content of the object.

If the object is a person or an object in a picture or an image, a target human face or a target object is extracted using an image edge detection technology, and then image recognition (for example, facial recognition or object recognition) and related content query (for example, a profile information query, a similar human face query, and an object introduction information query) are performed to obtain a recognition result and a query result (the query result may be a plain text, a text with an image, or may be of an image format). The related content of the object sent by the portable electronic device to the head mounted display may be related attribute information of a detected person or object or a queried person or object.

For example, the portable electronic device is a smart watch and the head mounted display is smart glasses. A user wears the smart glasses, gazes at a "sport information" area on the smart watch, and speaks "details", the smart watch automatically transmits details of sport information to the smart glasses, and the smart glasses present the details in an AR manner.

For another example, when the smart watch of the user receives a notification message, the user uplifts a wrist to view the notification information. At this time, the user wearing the smart glasses only needs to gaze at a notification message screen and speaks "details" to trigger the watch to transmit details of the message to the smart glasses. The smart glasses present the details in an AR manner.

Figure 8:
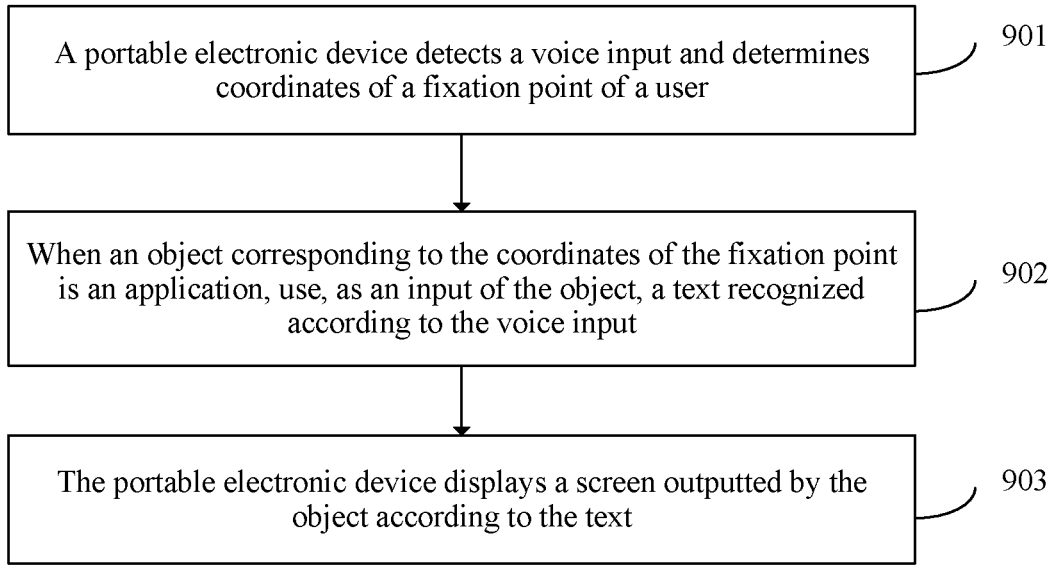
FIG. 8 is another schematic flowchart of a display method according to this application.

Referring to FIG. 8, this application provides a processing method, including the following steps.

Step 901. A portable electronic device detects a voice input and determines coordinates of a fixation point of a user.

An eye tracking module of a head mounted display obtains, in real time, a relative location of a line of sight focus of the user on a screen of the portable electronic device, that is, coordinates. Generally, an origin of a coordinate system is an upper-left corner of a screen of the portable electronic device. A positive direction of the x-axis is a direction in which the origin horizontally extends rightward, and a positive direction of the y-axis is a direction in which the origin vertically extends downward. The head mounted display may send, periodically or in real time, real-time coordinates (x, y) of the line of sight focus to the portable electronic device. A sending period may be customized according to an actual product need, for example, the period may be set to one second.

In another possible implementation, the portable electronic device may detect a user eye movement in real time using a photographing module in order to obtain coordinates of the line of sight focus of the user on the screen.

Step 902. When an object corresponding to the coordinates of the fixation point is an application, use, as an input of the object, a text recognized according to the voice input.

A voice spoken by the user may include a voice instruction for browsing display, such as "preview", "open", "translate", and "search" such that the portable electronic device may use a text corresponding to the voice of the user as the input of the object.

Step 903. The portable electronic device displays a screen outputted by the object according to the text.

Because a target object corresponding to the line of sight focus is an APP object, the portable electronic device obtains an attribute or capability information of the App itself, and uses the text corresponding to the voice as input information of the App in order to perform specific processing that matches the attribute or the capability information of the App itself. For example, the text is used as input information in a map App to search for a location or a route, the text is used as input information in an E-commerce App to search for a commodity, the text is used as input information in a browser to search for a web page, the text is used as input information in a weather App to query weather, the text is used as an image feature keyword to perform image searching in an album to obtain a matching picture/photo, the text is used as input information in a music player to search for a singer or a song, the text is used as a corresponding channel keyword in a radio App to search for and play a corresponding radio station, and so on.

Figure 9:
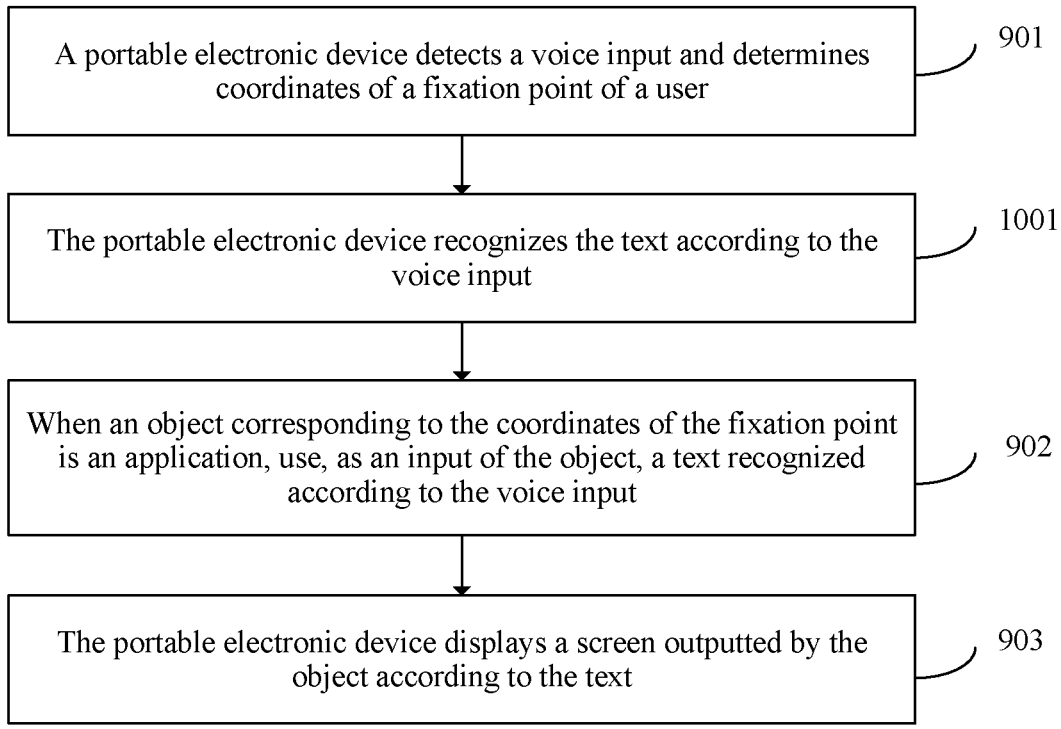
FIG. 9 is another schematic flowchart of a display method according to this application.

With reference to an embodiment in FIG. 8, referring to FIG. 9, optionally, after the voice input is detected, the method further includes the following step.

Step 1001. The portable electronic device recognizes the text according to the voice input.

A voice monitoring module in the portable electronic device may continuously monitor a voice input, perform voice recognition on any voice content inputted by the user, convert the voice content into a text, and use the text as candidate processing information (however, extra power consumption increases in this manner).

In another possible implementation, a "low-power voice-monitoring module" monitors a voice wakeup keyword (for example, a preset "Hi, little e"). When the voice wakeup keyword is detected, the voice recognition module is started to monitor and recognize voice content spoken after the voice wakeup keyword, convert the voice content into a text, and use the text as the candidate processing information. Maximum power is saved in this manner.

With reference to an embodiment in FIG. 9, optionally, recognizing the text according to the voice input includes determining, according to a voiceprint of the voice, that the user is a preset user, and converting the voice into text information.

In a possible implementation, voiceprint recognition is performed on a voice of a user. If it is determined, according to a voiceprint feature, that the user is a preset user, a voice spoken by the user is recognized and converted into a text, and the text is used as candidate processing information. In this manner, a voice of another user except the preset user may be filtered out in order to improve usage security of a product.

Figure 11:
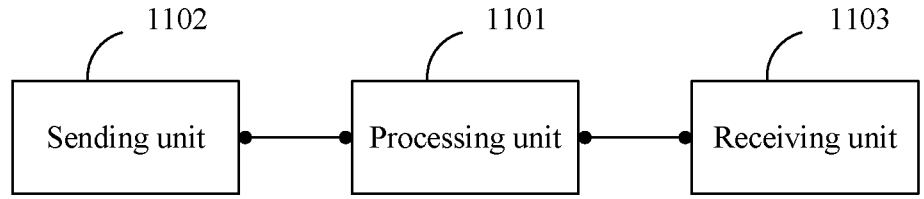
FIG. 11 is a schematic diagram of a head mounted display according to this application.

With reference to FIG. 11, this application provides a head mounted display. The head mounted display keeps a wireless connection to a portable electronic device and includes a processing unit 1101, a sending unit 1102, and a receiving unit 1103. In a possible implementation, the processing unit 1101 may be replaced by a processor, the sending unit 1102 may be replaced by a sender, and the receiving unit 1103 may be replaced by a receiver.

The processing unit 1101 is configured to detect an instruction and determine coordinates of a fixation point of a user on a screen of the portable electronic device.

The sending unit 1102 is configured to send the coordinates and an indication to the portable electronic device, where the indication is used to identify the instruction.

The receiving unit 1103 is configured to receive related content of an object corresponding to the coordinates sent by the portable electronic device, where the related content is obtained by the portable electronic device according to the coordinates and the indication.

The processing unit 1101 is further configured to display the related content on a virtual screen corresponding to the portable electronic device.

In a possible implementation, the related content of the object corresponding to the coordinates includes a screenshot of a preset range on the screen of the portable electronic device.

The processing unit 1101 is further configured to determine another group of coordinates of the fixation point of the user on the screenshot displayed on the virtual screen, and change the other group of coordinates into coordinates applicable to the screen of the portable electronic device.

The sending unit 1102 is further configured to send the changed other group of coordinates to the portable electronic device.

The receiving unit 1103 is further configured to receive another related content of an object corresponding to the changed other group of coordinates sent by the portable electronic device.

The processing unit 1101 is further configured to display the other related content on the virtual screen corresponding to the portable electronic device.

In another possible implementation, before the processing unit 1101 displays the related content on the virtual screen corresponding to the portable electronic device, the processing unit 1101 is further configured to enlarge the related content according to a preset multiple.

The processing unit 1101 is further configured to display the enlarged related content on the virtual screen corresponding to the portable electronic device.

In another possible implementation, the processing unit 1101 is further configured to display all the related content on the virtual screen that is corresponding to the portable electronic device and on which preset zooming is performed.

In another possible implementation, the processing unit 1101 is further configured to display a mark of the fixation point of the user on at least one of the screen of the portable electronic device or the virtual screen.

In another possible implementation, the processing unit 1101 is further configured to detect another instruction and stop displaying the related content or the other related content on the virtual screen, or close the virtual screen, where the other voice instruction is used to instruct the head mounted display and the portable electronic device to perform an operation of stop displaying the related content.

Figure 12:
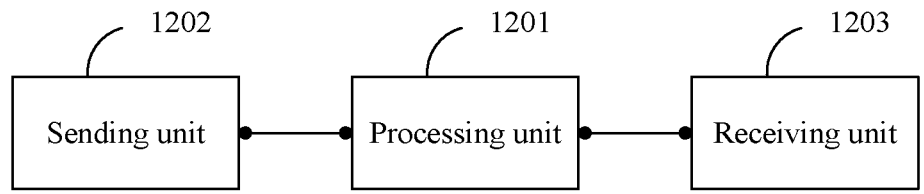
FIG. 12 is another schematic diagram of a head mounted display according to this application.

With reference to FIG. 12, in another implementation, a head mounted display provided in this application includes a processing unit 1201, a sending unit 1202, and a receiving unit 1203. In a possible implementation, the processing unit 1201 may be replaced by a processor, the sending unit 1202 may be replaced by a sender, and the receiving unit 1203 may be replaced by a receiver.

The processing unit 1201 is configured to detect an instruction and determine coordinates of a fixation point of a user on a screen of the portable electronic device.

The sending unit 1202 is configured to send the coordinates to the portable electronic device.

The receiving unit 1203 is configured to receive related content of an object corresponding to the coordinates sent by the portable electronic device, where the related content is obtained by the portable electronic device according to the coordinates.

The processing unit 1201 is further configured to display the related content on a virtual screen corresponding to the portable electronic device.

In a possible implementation, before the processing unit 1201 displays the related content on the virtual screen corresponding to the portable electronic device, the processing unit 1201 is further configured to enlarge the related content according to a preset multiple.

The processing unit is further configured to display the enlarged related content on the virtual screen corresponding to the portable electronic device.

In another possible implementation, the processing unit 1201 is further configured to display all the related content on the virtual screen that is corresponding to the portable electronic device and on which preset zooming is performed.

Figure 13:
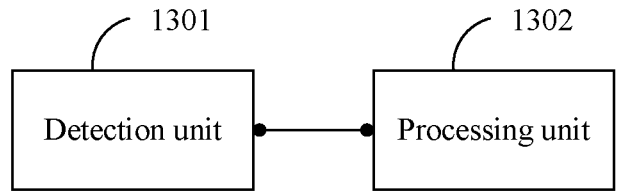
FIG. 13 is a schematic diagram of a portable electronic device according to this application.

With reference to FIG. 13, this application further provides a portable electronic device, including a detection unit 1301 and a processing unit 1302. In a possible implementation, the detection unit 1301 may be replaced by a detector, and the processing unit 1302 may be replaced by a processor.

The detection unit 1301 is configured to detect a voice input.

The processing unit 1302 is configured to determine coordinates of a fixation point of a user, when an object corresponding to the coordinates of the fixation point is an application, use, as an input of the object, a text recognized according to the voice input, and display a screen outputted by the object according to the text.

In a possible implementation, after the detection unit 1301 detects the voice input, the processing unit 1302 is further configured to recognize the text according to the voice input.

In another possible implementation, the processing unit 1302 is further configured to determine that a voiceprint of the voice input matches a pre-stored voiceprint, and recognize the text according to the voice input.

Figure 14:
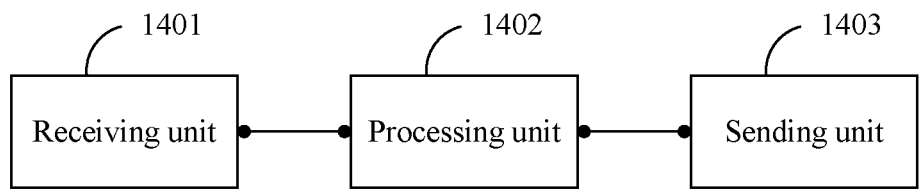
FIG. 14 is another schematic diagram of a portable electronic device according to this application.

With reference to FIG. 14, in another possible implementation, a portable electronic device provided in this application includes a receiving unit 1401, a processing unit 1402, and a sending unit 1403. In a possible implementation, the receiving unit 1401 may be replaced by a receiver, the processing unit 1402 may be replaced by a processor, and the sending unit 1403 may be replaced by a sender.

The receiving unit 1401 is configured to receive coordinates sent by the head mounted display, where the coordinates are coordinates that are determined by the head mounted display and that are of a fixation point of a user on a screen of the portable electronic device.

The processing unit 1402 is configured to determine a type of an object, and determine related content of the object according to the type of the object when the object corresponding to the coordinates is manipulable.

The sending unit 1403 is configured to send the related content to the head mounted display.

In a possible implementation, the processing unit 1402 is further configured to, if the type of the object is a picture thumbnail, perform an open operation on the object, and use, as the related content of the object, content obtained after the open operation, if the type of the object is a video thumbnail, perform an open operation or a play operation on the object, and use, as the related content of the object, content obtained after the open operation or the play operation, if the type of the object is a folder or a directory, perform an open operation on the object, take a screenshot of content obtained after the open operation, and use the screenshot as the related content of the object, if the type of the object is a hyperlink, perform an open operation or a loading operation on the object, take a screenshot of content obtained after the open operation or the loading operation, and use the screenshot as the related content of the object, if the type of the object is an application icon, perform an open operation on the object, and use, as the related content of the object, content obtained after the open operation, if the type of the object is a character or a text, perform at least one operation of a searching operation and a translation operation on the object, and use, as the related content of the object, content obtained after the at least one operation, or if the type of the object is a picture or an image, perform image recognition on the object, perform a searching operation on a recognized face or a recognized object, and use, as the related content of the object, content obtained after the searching operation.

Figure 15:
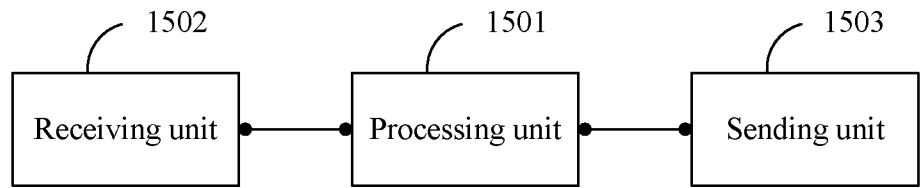
FIG. 15 is another schematic diagram of a portable electronic device according to this application.

With reference to FIG. 15, in another possible implementation, a portable electronic device provided in this application includes a processing unit 1501, a receiving unit 1502, and a sending unit 1503. In a possible implementation, the processing unit 1501 may be replaced by a processor, the receiving unit 1502 may be replaced by a receiver, and the sending unit 1503 may be replaced by a sender.

The processing unit 1501 is configured to detect an instruction.

The receiving unit 1502 is configured to receive coordinates sent by the head mounted display, where the coordinates are coordinates that are determined by the head mounted display and that are of a fixation point of a user on a screen of the portable electronic device.

The processing unit 1501 is further configured to obtain, according to the instruction, related content of an object corresponding to the coordinates.

The sending unit 1503 is configured to send the related content to the head mounted display.

Figure 16:
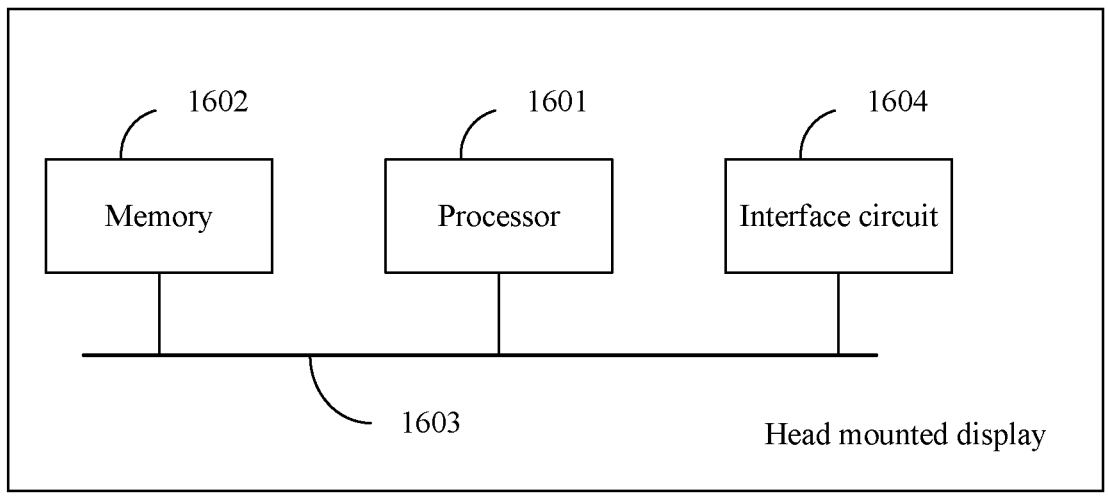
FIG. 16 is another schematic diagram of a head mounted display according to this application.

With reference to FIG. 16, in another possible implementation, a head mounted display provided in this application includes one or more processors 1601, a memory 1602, a bus system 1603, and an interface circuit 1604, where the one or more processors 1601, the memory 1602, and the interface circuit 1604 are connected using the bus system 1603.

The memory 1602 stores a computer instruction. When the one or more processors 1601 execute the computer instruction, the head mounted display executes a step that the head mounted display needs to execute in any embodiment in FIG. 4 to FIG. 7.

Figure 17:
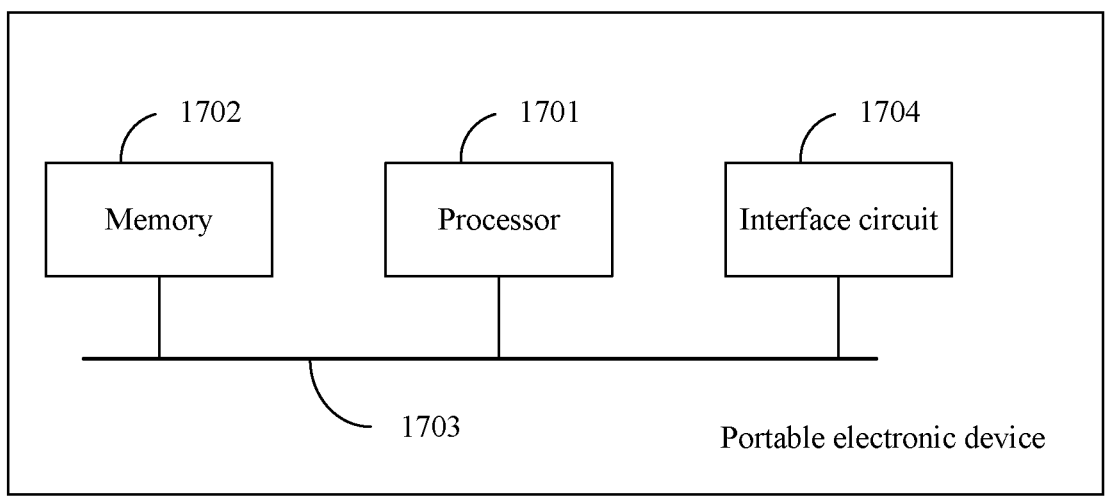
FIG. 17 is another schematic diagram of a portable electronic device according to this application.

With reference to FIG. 17, in another possible implementation, a portable electronic device provided in this application includes one or more processors 1701, a memory 1702, a bus system 1703, and an interface circuit 1704, where the one or more processors 1701, the memory 1702, and the interface circuit 1704 are connected using the bus system 1703.

The memory 1702 stores a computer instruction. When the one or more processors 1701 execute the computer instruction, the portable electronic device executes a step that the portable electronic device needs to execute in any embodiment in FIG. 4 to FIG. 7 or a step in any embodiment in FIG. 8 and FIG. 9.

This application further provides a readable storage medium that stores one or more programs. The one or more programs include an instruction. When the instruction is being executed by a head mounted display, the head mounted display executes a step that the head mounted display needs to execute in any embodiment in FIG. 4 to FIG. 7.

This application further provides another readable storage medium that stores one or more programs. The one or more programs include an instruction. When the instruction is being executed by a portable electronic device, the portable electronic device executes a step that the portable electronic device needs to execute in any embodiment in FIG. 4 to FIG. 7 or a step in any embodiment in FIG. 8 and FIG. 9.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A display method, applied to a head mounted display keeping a wireless coupling to a portable electronic device, comprising:
   detecting an instruction and determining coordinates of a fixation point of a user on a screen of the portable electronic device;
   sending the coordinates and an indication identifying the instruction from the head mounted display to the portable electronic device;
   receiving related content of an object corresponding to the coordinates from the portable electronic device;
   enlarging the related content according to a preset multiple to form enlarged related content;
   displaying the enlarged related content only on a virtual screen corresponding to the portable electronic device and not displaying the enlarged related content on the screen of the portable electronic device;
   displaying a mark of the fixation point;
   detecting whether the mark of the fixation point remains at a single point for a time exceeding a preset threshold;
   blinking the mark of the fixation point when the time exceeds the preset threshold; and
   selecting a target object associated with the single point when the time exceeds the preset threshold.

2. The display method of claim 1, wherein the related content of the object corresponding to the coordinates comprises a screenshot of a preset range on the screen of the portable electronic device, and wherein the display method further comprises:
   determining another group of coordinates of the fixation point of the user on the screenshot displayed on the virtual screen;
   changing the other group of coordinates into coordinates applicable to the screen of the portable electronic device;
   sending the changed other group of coordinates to the portable electronic device;
   receiving another related content of an object corresponding to the changed other group of coordinates from the portable electronic device; and
   displaying the other related content on the virtual screen corresponding to the portable electronic device.

3. The display method of claim 1, wherein displaying the enlarged related content on the virtual screen corresponding to the portable electronic device comprises displaying all the related content on the virtual screen corresponding to the portable electronic device and on which preset zooming is performed.

4. The display method of claim 1, further comprising:
detecting another instruction instructing the head mounted display and the portable electronic device to perform an operation of stop displaying the related content and stop displaying the related content on the virtual screen; or
closing the virtual screen.

5. A head mounted display, keeping a wireless coupling to a portable electronic device, comprising:
a processor configured to detect an instruction and determine coordinates of a fixation point of a user on a screen of the portable electronic device;
a transmitter coupled to the processor and configured to send the coordinates and an indication identifying the instruction from the head mounted display to the portable electronic device; and
a receiver coupled to the processor and the transmitter and configured to receive related content of an object corresponding to the coordinates from the portable electronic device, and
wherein the processor is further configured to:
enlarge the related content according to a preset multiple to form enlarged related content;
display the enlarged related content only on a virtual screen corresponding to the portable electronic device and not display the enlarged related content on the screen of the portable electronic device;
display a mark of the fixation point of the user;
detect whether the mark of the fixation point remains at a single point for a time exceeding a preset threshold;
blink the mark of the fixation point when the time exceeds the preset threshold; and
select a target object associated with the single point when the time exceeds the preset threshold.

6. The head mounted display of claim 5, wherein the related content of the object corresponding to the coordinates comprises a screenshot of a preset range on the screen of the portable electronic device, and wherein the processor is further configured to:
determine another group of coordinates of the fixation point of the user on the screenshot displayed on the virtual screen; and
change the other group of coordinates into coordinates applicable to the screen of the portable electronic device,
wherein the transmitter is further configured to send the changed other group of coordinates to the portable electronic device,
wherein the receiver is further configured to receive another related content of an object corresponding to the changed other group of coordinates from the portable electronic device, and
wherein the processor is further configured to display the other related content on the virtual screen corresponding to the portable electronic device.

7. The head mounted display of claim 5, wherein the processor is further configured to display all the related content on the virtual screen corresponding to the portable electronic device and on which preset zooming is performed.

8. The head mounted display of claim 5, wherein the processor is further configured to:
detect another instruction instructing the head mounted display and the portable electronic device to perform an operation of stop displaying the related content and stop displaying the related content on the virtual screen; or
close the virtual screen.

9. The display method of claim 1, further comprising obtaining three-dimensional coordinates of the portable electronic device in a three-dimensional coordinate system.

10. The display method of claim 1, further comprising tracking eye movement of the user.

11. The display method of claim 1, wherein the portable electronic device comprises a smart watch or a smart phone.

12. The display method of claim 1, wherein the instruction is configured to prompt the portable electronic device to run an application on the portable electronic device.

13. The display method of claim 1, wherein the instruction is configured to prompt the portable electronic device to open a folder on the portable electronic device.

14. The display method of claim 1, wherein the instruction is configured to prompt the portable electronic device to perform a query for an object located in the fixation point.

15. The display method of claim 1, wherein the instruction is configured to prompt the portable electronic device to perform a translation.

16. The display method of claim 1, wherein the head mounted display and the portable electronic device are directly coupled together using a BLUETOOTH connection.

17. The display method of claim 1, wherein the mark of the fixation point comprises a red spot, wherein the preset threshold comprises two seconds, and wherein the method further comprises blinking the red spot when the time exceeds the two seconds.

18. The head mounted display of claim 5, wherein the mark of the fixation point comprises a red spot, wherein the preset threshold comprises two seconds, and wherein the processor is further configured to blink the red spot when the time exceeds the two seconds.

19. A computer program product comprising computer-executable instructions for storage on a non-transitory computer-readable medium that, when executed by a processor, cause an apparatus to:
detect an instruction and determine coordinates of a fixation point of a user on a screen of a portable electronic device;
send the coordinates and an indication identifying the instruction from a head mounted display to the portable electronic device;
receive related content of an object corresponding to the coordinates from the portable electronic device;
enlarge the related content according to a preset multiple to form enlarged related content;
display the enlarged related content only on a virtual screen corresponding to the portable electronic device and not display the enlarged related content on the screen of the portable electronic device;
display a mark of the fixation point of the user;
detect whether the mark of the fixation point remains at a single point for a time exceeding a preset threshold;
blink the mark of the fixation point when the time exceeds the preset threshold; and
select a target object associated with the single point when the time exceeds the preset threshold.

20. The computer program product of claim 19, wherein the mark of the fixation point comprises a red spot, wherein the preset threshold comprises two seconds, and wherein the instruction further causes the apparatus to blink the red spot when the time exceeds the two seconds.

* * * * *

UNITED STATES PATENT AND TRADEMARK OFFICE
CERTIFICATE OF CORRECTION

PATENT NO. : 10,921,979 B2  
APPLICATION NO. : 15/781618  
DATED : February 16, 2021  
INVENTOR(S) : Wenmei Gao et al.

Page 1 of 1

It is certified that error appears in the above-identified patent and that said Letters Patent is hereby corrected as shown below:

On the Title Page

Page 2, (56) References Cited, Foreign Reference: "WO 201401831 A1 12/2014" should read "WO 2014201831 A1 12/2014"

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*